United States Patent
Tahara et al.

(10) Patent No.: US 7,459,189 B2
(45) Date of Patent: Dec. 2, 2008

(54) LIQUID CRYSTAL OPTICAL ELEMENT AND PROCESS FOR ITS PRODUCTION

(75) Inventors: Shinya Tahara, Yokohama (JP); Seiji Kojima, Yokohama (JP); Shunichi Suwa, Yokohama (JP); Masao Ozeki, Yokohama (JP); Satoshi Niiyama, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 712 days.

(21) Appl. No.: 11/013,421

(22) Filed: Dec. 17, 2004

(65) Prior Publication Data

US 2005/0206832 A1    Sep. 22, 2005

(30) Foreign Application Priority Data

Dec. 19, 2003    (JP) .............................. 2003-423886

(51) Int. Cl.
C09K 19/38 (2006.01)
G02F 1/1333 (2006.01)
G02F 1/1334 (2006.01)

(52) U.S. Cl. .................. 428/1.3; 428/1.1; 428/1.5; 349/86; 349/88; 349/183

(58) Field of Classification Search ............ 252/299.01; 428/1.1, 1.3, 1.5; 349/182, 86, 88, 183
See application file for complete search history.

(56) References Cited

U.S. PATENT DOCUMENTS

| 5,188,760 A | 2/1993 | Hikmet et al. | |
| 5,594,569 A * | 1/1997 | Konuma et al. | ............. 349/122 |
| 6,723,393 B1 | 4/2004 | Niyama et al. | |

FOREIGN PATENT DOCUMENTS

| EP | 1 154 006 A1 | 11/2001 |
| JP | 07-318910 | * 12/1995 |
| WO | WO 92/19695 | 11/1992 |
| WO | WO-9529967 | * 11/1995 |
| WO | WO-9937735 | * 7/1999 |

OTHER PUBLICATIONS

English translation by computer for JP 07-318910, http://www4.ipdl.inpit.go.jp/Tokujitu/PAJdetail.ipdl?N0000=60&N0120=01&N2001=2&N3001=H07-318910.*
S. Tahara, et al., "Three-dimensional morphology of LCPC using confocal fluoroscence microscopy", SPIE 1998, 8 pages.
Hiroto Sato, et al., Flexible Ferroelectric Liquid Crystal Device Using Polymer Wall and Network, IDW2001, pp. 89-92.

* cited by examiner

*Primary Examiner*—Shean C Wu
(74) *Attorney, Agent, or Firm*—Oblon, Spivak, McClelland, Maier & Neustadt, P.C.

(57) ABSTRACT

A liquid crystal/polymer composite is sandwiched between a pair of substrates with electrodes, the polymer forms a plurality of column resins, column resins of which the major axis directions substantially agree with the normal direction of the substrate plane and column resins which are aligned on the tilt coexist, the content of the polymer is at least 10 wt %, the alignment of the liquid crystal substantially agrees with the normal direction and the liquid crystal is in a light transmitting state under application of no voltage, and the alignment of the liquid crystal changes and the liquid crystal is in a light scattering state under application of a voltage.

22 Claims, 5 Drawing Sheets

LIQUID CRYSTAL OPTICAL ELEMENT AND PROCESS FOR ITS PRODUCTION

TECHNICAL FIELD

The present invention relates to a liquid crystal optical element comprising a pair of substrates with electrodes and an electrooptical functional layer containing a liquid crystal and a polymer sandwiched between the substrates, constituted to exhibit a light beam transmitting state and a light beam scattering state by changing the alignment state of the liquid crystal in response to application of a voltage, and a process for its production.

BACKGROUND ART

Heretofore, a liquid crystal/polymer composite liquid crystal optical element equipped with an operation mode of transmission/scattering type has been known. The liquid crystal/polymer composite controls a light by a difference in refractive index between the polymer and the liquid or in the domain in the interior of the liquid crystal. Mainly, a voltage is applied to the facing electrodes to change the optical characteristics. It is also called a polymer dispersed liquid crystal element (PDLC) or simply a dispersed liquid crystal.

A transmission/scattering type liquid crystal optical element requires no polarizing plate in principle, as different from a TN or STN liquid crystal optical element. Accordingly, it basically provides a high light transmittance, and it is used, in combination with the scattering characteristics, for e.g. a light-controlling glass, an optical shutter and a laser equipment.

As basic technique of a liquid crystal optical element having a liquid crystal/polymer composite layer, the following may be mentioned. First, prior art reference 1 discloses formation of a liquid crystal optical element from a mixed liquid of a liquid crystal and a polymerizable liquid crystal. The mixed liquid is disposed in a liquid crystal cell in an aligned state and irradiated with ultraviolet rays to form a gel from the mixed liquid. In prior art reference 1 (U.S. Pat. No. 5,188, 760), this gel is referred to as an anisotropic gel in particular.

Further, in the liquid crystal optical element as disclosed in prior art reference 1, the refractive index of the liquid crystal when no voltage is applied and the refractive index of the anisotropic gel (polymerized polymer) substantially agree with each other. Accordingly, an optical element highly transparent regardless of the direction of view can be obtained. Further, when a voltage is applied, the alignment of the liquid crystal changes due to the dielectric anisotropy of the liquid crystal, whereby the refractive index of the liquid crystal and the refractive index of the anisotropic gel become different from each other, and the optical element exhibits a scattering state.

Prior art reference 2 (WO 92/19695) discloses one comprising a chiral nematic liquid crystal having positive dielectric anisotropy and a very small amount of a polymer dispersed in the liquid crystal. Its basic structure is the same as in prior art reference 1. A transparent state is obtained under application of no voltage and a scattering state is obtained under application of a voltage. The liquid crystal optical element of prior art reference 2 is called PSCT (polymer stabilized cholesteric texture).

Further, prior art reference 3 (European Patent Publication 1154006 A1, (EXAMPLE 7)) discloses that a mixture of a polymer and a liquid crystal having negative dielectric anisotropy is sandwiched between vertical alignment films to form a liquid crystal/polymer composite by polymer phase separation.

A reverse mode dispersed liquid crystal optical element as disclosed in the above prior art references 1 to 3, i.e. an element which shows a transparent state when no voltage is applied, looks like a glass plate. Accordingly, it can be used as a highly transparent glass product with functions added. For example, it can be used as a light-controlling glass, a head-up display, a display panel of game machines and a public display device.

For such uses, the surface of a liquid crystal optical element is not protected and is exposed in many cases, so as to obtain high transparency. However, in such a sate, it is likely that a person directly touches or an object bumps against the surface of the liquid crystal optical element. In such a case, on the surface, particularly on the portion to which an impact is applied, of the liquid crystal optical element, white turbidity which will not become transparent again may occur in some cases.

The cause of this white turbidity is considered to be because the structure of a polymer (such as a polymerized product of e.g. a monomer) in the interior of the liquid crystal optical element is destructed and deformed. Further, it is considered to be because not only the shape of the polymer is partially deformed but also the alignment of the liquid crystal around the periphery thereof is changed.

The portion with such white turbidity will not recover to the original state even when a driving voltage sufficient to change the optical state is applied to the liquid crystal optical element. So-called reversible stable optical state is impaired. Thus, at the portion with white turbidity, the display function is lost, and the originally desired display operation can not be carried out.

Further, there will be the above problem of white turbidity also when a liquid crystal optical element is produced or when the liquid crystal optical element is assembled into e.g. a display device. For example, an impact is applied to a liquid crystal cell in a production process by some external factor in some cases. Then, white turbidity as mentioned above occurs, which leads to a decrease in yield in the entire process for producing a liquid crystal optical element.

Under these circumstances, the present invention has been made to overcome the above problems, and its object is to provide a liquid crystal optical element excellent in impact resistance, and a process for producing it.

DISCLOSURE OF THE INVENTION

According to a first aspect of the present invention, there is provided a liquid crystal optical element, which comprises a pair of substrates with electrodes, of which at least one is transparent, and an electrooptical functional layer containing a liquid crystal and a polymer sandwiched between the substrates, and which is designed to exhibit a light beam transmitting state and a light beam scattering state by changing the alignment state of the liquid crystal in response to application of a voltage, wherein the polymer forms column resins, as the column resins, resins of which the major axis directions substantially agree with the normal direction of the plane of the substrates with electrodes, and resins which tilt from the normal direction, coexist, the content of the polymer in the electrooptical functional layer is at least 10 wt %, and the alignment direction of the liquid crystal in the light beam transmitting state substantially agrees with the normal direction of the substrate plane.

According to the first aspect of the present invention, a liquid crystal optical element excellent in impact resistance can be obtained by compositively designing conditions of the content of the polymer, the shape of the polymer and the alignment property of the polymer in the liquid crystal/polymer composite layer. This is considered to be because a strong structure not only in the normal direction but also in the horizontal relation to the substrate face is realized when the above compositive conditions are satisfied. As a result, deformation of a polymer when an impact is applied thereto and formation of white turbidity due to the change in alignment of the liquid crystal around the periphery thereof can be suppressed, and a liquid crystal optical element excellent in impact resistance can be provided. If the content of the polymer in the liquid crystal/polymer composite layer 5 is less than 10 wt %, the scattering intensity, the impact resistance, the voltage resistance, the reliability, etc. may decrease.

According to a second aspect of the present invention, there is provided the above liquid crystal optical element, wherein among the column resins, the resins which tilt from the normal direction of the plane of the substrates with electrodes, have an average tilt angle of from 15 to 50°. The average tilt angle is the average of the angles formed by the normal direction of the substrate plane and the major axis directions of the column resins which are aligned on the tilt. By such a constitution, a liquid crystal optical element which is more excellent in impact resistance can be provided. If the average tilt angle exceeds 50°, the domains of the liquid crystal tend to be non-uniform, and the driving voltage may increase or the scattering characteristics may decrease. Further, if the average tilt angle is less than 15°, the impact resistance may decrease. Namely, by flow of the liquid crystal accompanying the deformation of the substrate when an impact is applied, the polymer may be irreversibly deformed. Further, if the polymer is irreversibly deformed, white turbidity due to irregularities in alignment may occur.

According to a third aspect of the present invention, there is provided the above liquid crystal optical element, wherein at least part of the column resins have a branched moiety. By such a constitution, the impact resistance of the liquid crystal optical element can be effectively improved.

According to a forth aspect of the present invention, there is provided the above liquid crystal optical element, wherein at least part of the column resins having a branched moiety are connected to different column resins by means of the branched moiety. By such a constitution, the impact resistance of the liquid crystal optical element can be further improved.

According to a fifth aspect of the present invention, there is provided the above liquid crystal optical element, wherein the diameter of the column resins in the minor axis direction is from 0.05 to 1 µm. If the diameter is less than 0.05 µm, the impact resistance, the voltage resistance, the reliability, etc. may decrease, and if it exceeds 1 µm, transparency at the time of transmitting a light beam may decrease.

According to a sixth aspect of the present invention, there is provided the above liquid crystal optical element, wherein the area occupied by the column resins in the electrooptical functional layer on the horizontal plane to the substrate plane substantially decreases as the distance from the substrates with electrodes increases. By such a constitution, the liquid crystal domain region can be formed largely at a center region between the pair of the substrates. As a result, the increase in driving voltage can be suppressed.

According to a seventh aspect of the present invention, there is provided the above liquid crystal optical element, wherein the content of the polymer in the electrooptical functional layer is at most 50 wt %. If the content exceeds 50 wt %, the driving voltage may increase.

According to an eighth aspect of the present invention, there is provided a liquid crystal optical element, which comprises a pair of substrates with electrodes, of which at least one is transparent, and an electrooptical functional layer containing a liquid crystal and a polymer sandwiched between the substrates, and which is designed to exhibit a light beam transmitting state and a light beam scattering state by changing the alignment state of the liquid crystal in response to application of a voltage, wherein the polymer forms a plurality of assemblies of column resins, and each of the assemblies of the column resins is formed so that it has an axial core which substantially agrees with the normal direction of the plane of the substrates with electrodes, and the area occupied by the assemblies of the column resins in the electrooptical functional layer on the horizontal plane to the plane of the substrate with electrodes substantially decreases as the distance from the substrates with electrodes increases.

According to the eighth aspect of the present invention, by forming a plurality of assemblies of the column resins, a liquid crystal optical element excellent in impact resistance can be obtained. This is considered to be because a strong structure not only in the normal direction but also in the horizontal relation to the substrate plane is realized by formation of the above assemblies of the column resins. As a result, deformation of a polymer when an impact is applied thereto and formation of white turbidity due to the change in alignment of the liquid crystal around the periphery thereof can be suppressed, and a liquid crystal optical element excellent in impact resistance can be provided.

According to a ninth aspect of the present invention, there is provided the liquid crystal optical element according to the eighth aspect, wherein the assemblies of the column resins are connected to one another to form a domain region of the liquid crystal. The liquid crystal domain region is a space which the liquid crystal molecules occupy. By such a constitution, while improving the impact resistance, the liquid crystal domain region is adequately secured, and the increase in driving voltage which may occur when the content of the polymer is high can be suppressed.

According to a tenth aspect of the present invention, there is provided the liquid crystal optical element, wherein the liquid crystal is a nematic liquid crystal showing negative dielectric anisotropy, and an alignment film which aligns the liquid crystal vertically to the plane of the substrates with electrodes is provided on at least one of the substrates with electrodes.

According to an eleventh aspect of the present invention, there is provided a process for producing a liquid crystal optical element comprising a pair of substrates with electrodes, a pair of alignment films and an electrooptical functional layer containing a liquid crystal and a polymer sandwiched between the substrates and disposed to be in contact with the pair of alignment films, which comprises forming a liquid crystalline mixture (D) containing at least one type of a bifunctional polymerizable compound (A) represented by the formula (1), at least one type of a bifunctional polymerizable compound (B) represented by the formula (2) and a non-polymerizable liquid crystalline composition (C), disposing the mixture (D) between a pair of alignment films, and polymerizing the polymerizable compounds in the mixture (D) in a state where the mixture (D) shows liquid crystallinity, to form a polymer:

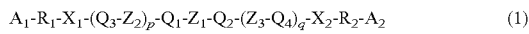

wherein each of $A_1$, $A_2$, $A_3$ and $A_4$ which are independent of one another, is an acryloyloxy group, a methacryloyloxy group, a vinyl ether group, a vinyl group or a glycidyl ether group;

each of $Q_1$, $Q_2$, $Q_3$ and $Q_4$ which are independent of one another, is a 1,4-phenylene group which may have a substituent, a 1,4-cyclohexylene group or a pyrimidine-2,5-diyl group;

each of $X_1$ and $X_2$ which are independent of each other, is a single bond, an oxygen atom or an ester linkage;

each of $R_1$ and $R_2$ which are independent of each other, is a single bond or a linear or branched $C_{1-20}$ alkylene group which may have one or more ethereal oxygen atoms between carbon atoms;

each of $Z_1$, $Z_2$ and $Z_3$ which are independent of one another, is a single bond, —C(=O)—O—, —O—C(=O)—, —CH$_2$—CH$_2$—, —C≡C—, —CH$_2$—O—, —O—CH$_2$—, —CH=N— or N=CH—;

$R_3$ is a linear or branched $C_{1-50}$ alkylene group which may have one or more ethereal oxygen atoms between carbon atoms; and each of p and q which are independent of each other, is 0 or 1.

According to a twelfth aspect of the present invention, there is provided the process for producing a liquid crystal optical element according to the eleventh aspect, wherein the bifunctional polymerizable compound (A) represented by the formula (1) is a compound which satisfies the following conditions:

each of $A_1$ and $A_2$ which are independent of each other, is an acryloyloxy group, a methacryloyloxy group or a vinyl ether group;

each of $Q_1$, $Q_2$, $Q_3$ and $Q_4$ which are independent of one another, is a 1,4-phenylene group which may have a substituent, or a 1,4-cyclohexylene group;

each of $X_1$ and $X_2$ which are independent of each other, is a single bond, an oxygen atom or an ester linkage;

each of $R_1$ and $R_2$ which are independent of each other, is a single bond or a linear or branched $C_{2-20}$ alkylene group which may have one or more ethereal oxygen atoms between carbon atoms;

each of $Z_1$, $Z_2$ and $Z_3$ which are independent of one another, is a single bond, —C(=O)—O—, —O—C(=O)—, —CH$_2$—CH$_2$—, —C≡C—, —CH$_2$—O— or —O—CH$_2$—; and each of p and q is 0, or one is 0 and the other is 1.

According to a thirteenth aspect of the present invention, there is provided the process for producing a liquid crystal optical element according to the eleventh or twelfth aspect, wherein the bifunctional polymerizable compound (A) represented by the formula (1) is a compound which satisfies the following conditions:

each of $A_1$ and $A_2$ which are independent of each other, is an acryloyloxy group or a methacryloyloxy group;

each of $Q_1$ and $Q_2$ is a 1,4-phenylene group which may have a substituent, and each of $Q_3$ and $Q_4$ which are independent of each other, is a 1,4-phenylene group which may have a substituent, or a 1,4-cyclohexylene group;

each of $Z_1$, $Z_2$ and $Z_3$ which are independent of one another, is a single bond, —C(=O)—O—, —O—C(=O)—, —CH$_2$—CH$_2$— or —C≡C—; and each of p and q is 0, or one is 0 and the other is 1.

According to a fourteenth aspect of the present invention, there is provided the process for producing a liquid crystal optical element according to the eleventh, twelfth or thirteenth aspect, wherein the bifunctional polymerizable compound (A) represented by the formula (1) is a compound which satisfies the following conditions:

each of $A_1$ and $A_2$ is an acryloyloxy group;

each of $Q_1$ and $Q_2$ is a 1,4-phenylene group which may have a substituent, and each of $Q_3$ and $Q_4$ which are independent of each other, is a 1,4-phenylene group which may have a substituent, or a 1,4-cyclohexylene group;

each of $R_1$ and $R_2$ which are independent of each other, is a linear or branched $C_{2-20}$ alkylene group;

$Z_1$ is a single bond, —C(=O)—O—, —O—C(=O)—, —CH$_2$—CH$_2$— or —C≡C—, and each of $Z_2$ and $Z_3$ is a single bond, and each of p and q is 0, or one is 0 and the other is 1.

According to a fifteenth aspect of the present invention, there is provided the process for producing a liquid crystal optical element according to the eleventh, twelfth, thirteenth or fourteenth aspect, wherein the bifunctional polymerizable compound (B) represented by the formula (2) is a compound which satisfies the following conditions:

each of $A_3$ and $A_4$ which are independent of each other, is an acryloyloxy group, a methacryloyloxy group or a vinyl ether group; and $R_3$ is —$R_4$— or —($R_5$—O)$_n$—$R_5$—, wherein $R_4$ is a $C_{2-20}$ linear or branched alkylene group, $R_5$ is a $C_{2-8}$ linear or branched alkylene group, and n is an integer of from 1 to 10.

According to a sixteenth aspect of the present invention, there is provided the process for producing a liquid crystal optical element according to the fifteenth aspect, wherein $R_4$ is a $C_{2-20}$ linear alkylene group, $R_5$ is —(CH$_2$)r—, —CH$_2$—CH(CH$_3$)—, —CH$_2$—CH$_2$—CH(CH$_3$)— or CH$_2$—CH$_2$—C(CH$_3$)$_2$— (wherein r is an integer of from 2 to 5), and n is an integer of from 1 to 6.

According to a seventeenth aspect of the present invention, there is provided the process for producing a liquid crystal optical element according to any one of the eleventh to sixteenth aspects, wherein the dielectric anisotropy of the non-polymerizable liquid crystalline composition (C) is negative.

According to an eighteenth aspect of the present invention, there is provided the process for producing a liquid crystal optical element according to any one of the eleventh to seventeenth aspects, wherein the bifunctional polymerizable compound (A) does not show liquid crystallinity as a single compound.

According to a nineteenth aspect of the present invention, there is provided the process for producing a liquid crystal optical element according to any one of the eleventh to eighteenth aspects, wherein the bifunctional polymerizable compound (A) shows liquid crystallinity as a single compound at a temperature at the time of polymerization.

According to a twentieth aspect of the present invention, there is provided the process for producing a liquid crystal optical element according to any one of the eleventh to nineteenth aspects, wherein the liquid crystalline mixture (D) contains from 5 to 30 mass % of the bifunctional polymerizable compound (A), from 0.5 to 20 mass % of the bifunctional polymerizable compound (B) and from 50 to 94.5 mass % of the non-polymerizable liquid crystalline composition (C) based on the total amount of the bifunctional polymerizable compound (A), the bifunctional polymerizable compound (B) and the non-polymerizable liquid crystalline composition (C), and the mixture (D) further contains from 0.01 to 20 parts by weight of a polymerization initiator based on the total amount of 100 parts by weight of the bifunctional polymerizable compound (A) and the bifunctional polymerizable compound (B).

According to a twenty-first aspect of the present invention, there is provided a liquid crystal optical element produced by means of the process for producing a liquid crystal optical element as defined in any one of the eleventh to twentieth aspects.

According to a twenty-second aspect of the present invention, there is provided a liquid crystal optical element produced by means of the process for producing a liquid crystal optical element as defined in any one of the eleventh to twentieth aspects, which comprises a pair of substrates with electrodes, of which at least one is transparent, and an electrooptical functional layer containing a liquid crystal and a polymer sandwiched between the substrates, and which is designed to exhibit a light beam transmitting state and a light beam scattering state by changing the alignment state of the liquid crystal in response to application of a voltage, wherein the polymer forms a plurality of column resins, as the column resins, resins of which the major axis directions substantially agree with the normal direction of the plane of the substrates with electrodes, and resins which tilt from the normal direction, coexist, the content of the polymer in the electrooptical functional layer is at least 10 wt %, and the alignment direction of the liquid crystal in the light beam transmitting state substantially agrees with the normal direction of the substrate plane.

According to the present invention, a liquid crystal optical element excellent in impact resistance can be provided. Particularly, the present invention has an excellent effect of providing a practically usable liquid crystal optical element in applications in which mechanical external force is likely to be applied.

BEST MODE FOR CARRYING OUT THE INVENTION

Now, the embodiments to which the present invention is applicable will be explained. The following explanation is with respect to the embodiments of the present invention, and the present invention is not limited to the following embodiments.

The liquid crystal optical element according to the present invention is one which can reversibly control the light beam transmitting state and the light beam scattering state in response to application of a driving voltage. The light beam transmitting state and the light beam scattering state are applied usually to visible light. In general, there are a normal mode and a reverse mode for the transmission/scattering mode of a liquid crystal optical element. The normal mode is such that the element is in a light beam transmitting state when a voltage is applied and in a light beam scattering state when no voltage is applied, and the reverse mode is such that the element is in a light beam scattering state when a voltage is applied and in a light beam transmitting state when no voltage is applied.

In general, it is preferred that the liquid crystal optical element is in a light beam transmitting state when no voltage is applied so that the presence of the element itself is not annoying nor oppressive to users, although it depends on the application and the purpose of use. Accordingly, in the present specification, explanation is made with reference to a liquid crystal optical element in a reverse mode. However, needless to say, the present invention is applicable to a liquid crystal optical element in a normal mode.

Figure 1:
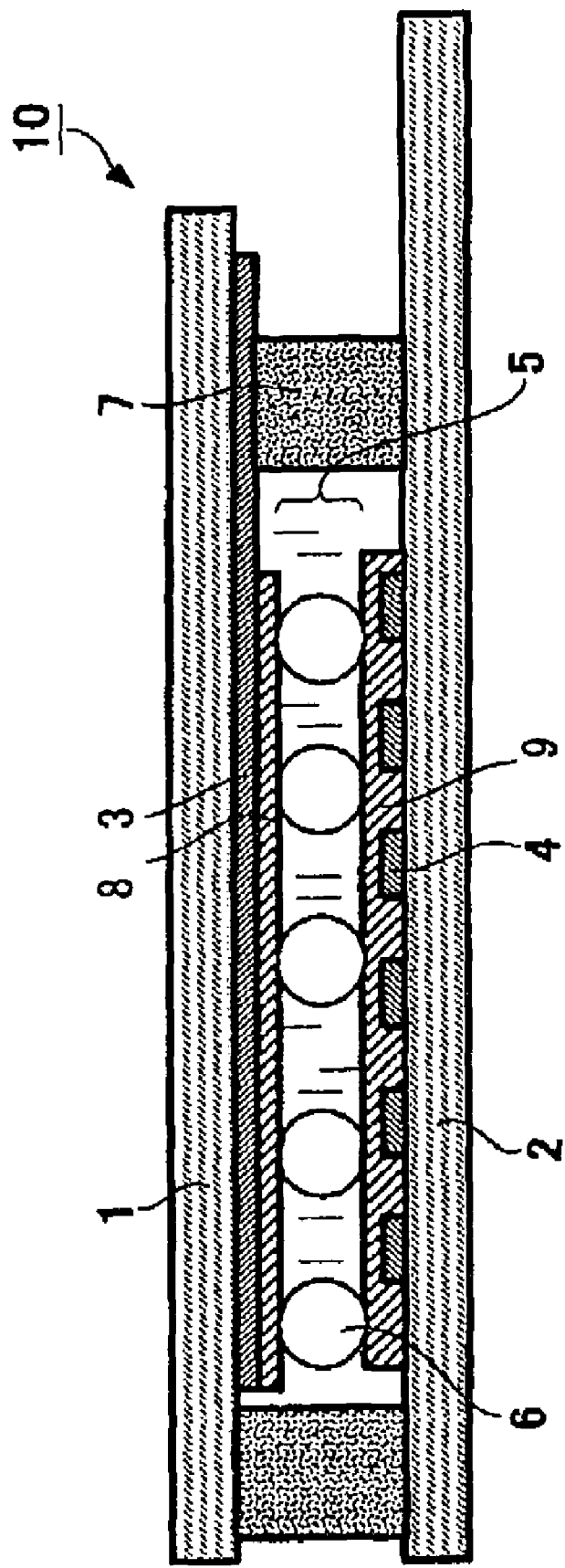
FIG. 1 is a sectional view schematically illustrating one example of the structure of the liquid crystal optical element according to the present invention.

FIG. 1 is a sectional view schematically illustrating one example of the structure of the liquid crystal optical element according to the present invention. As shown in FIG. 1, the liquid crystal optical element according to the present invention comprises a first substrate 1, a second substrate 2, a first electrode 3, a second electrode 4, a liquid crystal/polymer composite layer 5, spacers 6, a peripheral seal 7, a first alignment film 8, a second alignment film 9 and the like.

As each of the first substrate 1 and the second substrate 2, a transparent glass substrate, a film substrate of e.g. a polyester film or a substrate comprising a combination thereof, may, for example, be used. The first substrate 1 and the second substrate 2 are not necessarily the same substrate. For example, one of the pair of the substrates may be a substrate made of e.g. aluminum also having a function as an electrode or a substrate comprising a counter electrode of a dielectric multilayer film. The first substrate 1 and the second substrate 2 are disposed to face each other with a certain distance as shown in FIG. 1. The first substrate 1 and the second substrate 2 are not necessarily planate but may be shaped, such as curved.

On the planes which face each other among the principal planes of the first substrate 1 and the second substrate 2, patterns of the first electrode 3 and the second electrode 4 are respectively formed. As the first electrode 3 and the second electrode 4, a film of a metal oxide such as ITO (indium oxide/tin oxide) or tin oxide may, for example, be used. For example, a so-called glass with transparent electrode films, comprising glass substrates for the first substrate 1 and the second substrate 2 and films of a metal oxide such as ITO (indium oxide/tin oxide) or tin oxide formed as the first electrode 3 and the second electrode 4, a polyester film with a transparent electrode film, comprising polyethylene terephthalate (PET) and an ITO film formed on PET, or PES with a transparent electrode film, may be used. Further, an aluminum-deposited film or a gold-deposited film may be formed on one of the pair of the substrates.

On the first electrode 3 and the second electrode 4, the first alignment film 8 and the second alignment film 9 which are in contact with the liquid crystal/polymer composite layer 5 and which align the liquid crystal in the liquid crystal/polymer composite layer 5, are formed, respectively. The first alignment film 8 and the second alignment film 9 have a role to align the liquid crystal in a direction vertical to the substrate plane. The alignment power may be imparted e.g. by subjecting a thin film to rubbing treatment. The liquid crystal optical element does not necessarily have alignment films if the alignment of the liquid crystal can be controlled to be vertical to the substrate plane. For example, a first electrode 3 or a second electrode 4, the surface of which is directly polished, may be used, or an electrode to the surface of which a function to align the liquid crystal is imparted, may be used.

Between the first substrate 1 and the second substrate 2, as shown in FIG. 1, the liquid crystal/polymer composite layer 5 as an electrooptical functional layer and the spacers 6 are sandwiched. The spacers 6 have a role to define the thickness of the liquid crystal cell. Namely, the thickness of the liquid crystal/polymer composite layer 5 sandwiched between the substrates is defined by the spacer 6. As the material of the spacers 6, glass particles, resin particles, alumina particles, glass fibers or a film may, for example, be used. As the shape of the spacers, spherical spacers, fiber type spacers or column spacers may, for example, be used.

The thickness of the liquid crystal/polymer composite layer 5 is usually from 1 to 50 µm, more preferably from 5 to 30 µm. If the distance is too short, the contrast tends to decrease, and on the other hand, if the distance is too long, the driving voltage tends to increase.

The polymer contained in the liquid crystal/polymer composite layer 5 consists of a plurality of assemblies of the column resins. As the column resins, resins of which the major axis directions substantially agree with the normal direction of the plane of the substrates with electrodes, and resins which tilt from the normal direction, coexist. The content of the polymer in the liquid crystal/polymer composite layer is at least 10 wt %.

Figure 2:
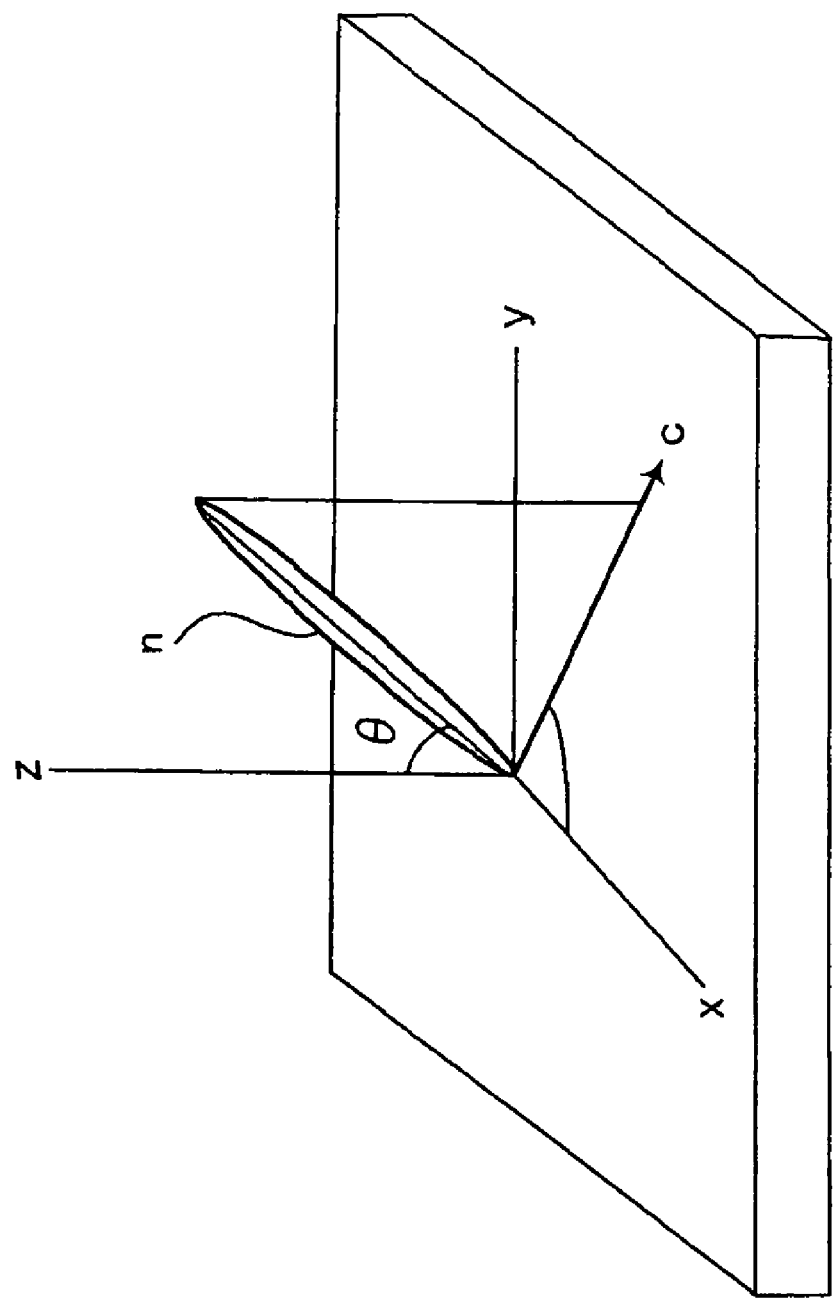
FIG. 2 is a drawing explaining the tilt alignment and the tilt azimuth of the column resins according to the present invention.

The column resin of which the major axis direction tilts from the normal direction is, as shown in FIG. 2, a resin of which the major axis direction n is on the tilt on the basis of the normal (z-axis in Fig.) of the substrate plane. As shown in FIG. 2, the angle θ formed by the normal (z-axis in Fig.) of the substrate plane and the major axis direction n of the column resin is referred to as a tilt angle. Further, the direction c of projection of the major axis direction n of the column resin on the substrate plane, on the basis of an optional direction (such as x-axis in Fig.) on the substrate plane, is referred to as a tilt azimuth.

As described above, when an impact is applied to the liquid crystal optical element from the outside, white turbidity which will not disappear may occur on the surface, particularly the portion to which an impact is applied, of the liquid crystal optical element. The cause of the white turbidity is considered to be because the structure of the polymer in the interior of the liquid crystal optical element is destructed and deformed. Further, it is considered to be because not only the shape of the polymer is partially deformed but also alignment of the liquid crystal around the periphery thereof is changed. The portion with such white turbidity will not recover to the original state even when a driving voltage sufficient to change the optical state is applied to the liquid crystal optical element. So-called reversible stable optical state is impaired. Accordingly, at the portion with white turbidity, the display function is lost, and the originally desired display operation is not carried out.

It is found that according to the first embodiment, by compositively designing the conditions of the content of the polymer, the shape of the polymer and the alignment property of the polymer in the liquid crystal/polymer composite layer, high impact resistance is obtained. This is considered to be because a strong structure not only in the normal direction but also in the horizontal direction of the substrate plane can be realized when the above compositive conditions are satisfied. As a result, deformation of the polymer when an impact is applied and formation of white turbidity due to the change in alignment of the liquid crystal around the periphery thereof, are suppressed, and a liquid crystal optical element having high impact resistance can be provided.

If the content of the polymer in the liquid crystal/polymer composite layer 5 is less than 10 wt %, the impact resistance, the voltage resistance, the reliability, etc. may decrease. With a view to suppressing the increase in driving voltage, the content of the polymer in the liquid crystal/polymer composite layer 5 is more preferably at most 50 wt %. The more preferred range of the content of the polymer in the liquid crystal/polymer composite layer is from 12 to 35 wt %, more preferably from 13 to 18 wt %.

Among the column resins, resins which are aligned on the tilt have an average tilt angle of preferably from 15 to 50°. The average tilt angle is the average of the angles formed by the normal direction of the substrate plane and the major axis directions of the column resins which are aligned on the tilt. If the average tilt angle exceeds 50°, the domains of the liquid crystal tend to be non-uniform, and the driving voltage may increase or the scattering characteristics may decrease. Further, if the average tilt angle is less than 15°, by flow of the liquid crystal accompanying the deformation of the substrate when an impact is applied, the polymer may be irreversibly deformed. Further, if the polymer is irreversibly deformed, white turbidity due to irregularities in alignment may occur. The average tilt angle is more preferably from 20 to 30°, with a view to satisfying various characteristics such as impact resistance and driving voltage.

The tilt azimuths of the resins which are aligned on the tilt among the column resins are not particularly limited. However, with a view to improving the impact resistance, the resins are aligned preferably in all azimuths, rather than aligned in a specific azimuth relative to the plane of the substrates with electrodes.

With respect to the column resins, at least part of the column resins may have a branched moiety. Further, the resins may be constituted to be connected with different column resins by means of the branched moiety. By such a constitution, the impact resistance of the liquid crystal optical element can further be improved.

The diameter of the column resins in the minor axis direction is preferably from 0.05 to 1 µm. If it is less than 0.05 µm, the impact resistance or the voltage resistance may decrease, or the reliability may decrease, and if it exceeds 1 µm, the transparency may decrease at the time of transmitting a light beam. The diameter of the column resins in the minor axis direction is more preferably from 0.1 to 0.5 µm, more preferably from 0.2 to 0.3 µm.

The area occupied by the column resins in the liquid crystal/polymer composite layer 5 on the horizontal plane to the plane of the substrates with electrodes, is designed to decrease as the distance from the vicinity of the substrates increases. By such a constitution, the liquid crystal domain region can be effectively formed at a center region between the pair of the substrates. Accordingly, the increase in driving voltage can be suppressed.

The polymer in the liquid crystal/polymer composite layer 5 is formed preferably in such a manner that a plurality of assemblies of the column resins are formed, each of the assemblies of the column resins has an axial core which substantially agrees with the normal direction of the plane of the substrates with electrodes, and the area occupied by the column resins in the electrooptical functional layer on the horizontal plane to the plane of the substrate with electrodes decreases as the distance from the substrates with electrodes increases. By such a constitution, a liquid crystal optical element excellent in impact resistance can be obtained. This is considered to be because a strong structure not only in the normal direction but also in the horizontal direction of the substrate plane can be realized by formation of the above assemblies of the column resins. As a result, deformation of the polymer when an impact is applied and formation of white turbidity due to the change in alignment of the liquid crystal around the periphery thereof, are suppressed, and a liquid crystal optical element excellent in impact resistance can be provided.

It is preferred that the assemblies of the column resins are connected with one another to form a liquid crystal domain region. The liquid crystal domain region is a space occupied by the liquid crystal molecules. By such a constitution, while improving the impact resistance, the liquid crystal domain region can be adequately secured, and the increase in driving voltage which may occur when the polymer content is high can be suppressed.

The column resins may be chemically or physically bonded to the surface of the substrates formed by e.g. the alignment film or may not be bonded.

With respect to the liquid crystal in the liquid crystal/polymer composite layer 5, the alignment direction of the liquid crystals in a light beam transmitting state is made to substantially agree with the normal direction of the substrate plane. The liquid crystal optical element is more favorably kept in a light beam transmitting state by vertically aligning the liquid crystal. In the present invention, as the reverse mode is employed, the liquid is aligned and the element is in a light beam transmitting state when no voltage is applied to the first electrode 3 and the second electrode.

On the other hand, when a voltage is applied to the first electrode 3 and the forth electrode 4, the liquid crystal is randomly aligned due to the electric field between the electrodes, and the element is in a light beam scattering state. The light beam scattering state and the light beam transmitting state can be controlled by application or non-application of a voltage, and thus a desired image can be displayed depending upon the formation pattern of the first electrode 3 and the second electrode 4.

As the type of the liquid crystal, a nematic liquid crystal, a cholesteric liquid crystal, a smectic liquid crystal or a ferroelectric liquid crystal may, for example, be used. Among them, it is preferred to use a nematic liquid crystal, which has a wide range of liquid crystal temperature and a low viscosity as compared with other liquid crystals, and therefore which can make the operating temperature range of the liquid crystal wide and the operating speed high. In a case where the liquid crystal has negative dielectric anisotropy, the liquid crystal is made to be vertical aligned.

As a liquid crystal compound, various ones used as a common display material or as a material of a field drive display element, may be used. Specifically, a biphenyl type, a phenylbenzoate type, a cyclohexylbenzene type, an azoxybenzene type, an azobenzene type, an azomethine type, a terphenyl type, a biphenyl benzoate type, a cyclohexyl biphenyl type, a phenyl pyridine type, a cyclohexyl pyrimidine type or a cholesterol type may, for example, be mentioned.

The liquid crystal compound is not necessarily used alone but two or more types of liquid crystal compounds may be used in combination, similar to a case where it is commonly used. Further, for the purpose of display by an electric field, it is preferred to use one having negative dielectric anisotropy among the above liquid crystal compounds. Further, in order to decrease the driving voltage, it is preferred to use one having a high absolute value of the dielectric anisotropy. As a liquid crystal compound having a high absolute value of the dielectric anisotropy, a compound having a cyano group or a halogen atom such as fluorine or chlorine as a substituent is used in view of chemical stability. A compound having a cyano group as a substituent is used when a decrease in driving voltage is important, and a compound having a fluorine atom as a substituent is used when reliability is important.

To the liquid crystal/polymer composite layer 5, various compounds may be added for the purpose of improving the contrast ratio and stability. For example, for the purpose of improving the contrast, a dichroic dye such as an anthraquinone type, a styryl type, an azomethine type or an azo type may be used. In such a case, the dichroic dye is preferably basically compatible with the liquid crystal compound and incompatible with the polymer compound. In addition, an antioxidant, an ultraviolet absorber or a plasticizer may also be preferably used with a view to improving the stability and durability.

In the liquid crystal optical element of the present invention, as described above, the liquid crystal/polymer composite layer 5 is a main constituting element in development of the optical function. The liquid crystal/polymer composite layer 5 is formed from a mixed liquid of a precursor of the liquid crystal/polymer composite layer (hereinafter sometimes referred to simply as "mixed liquid"). It is important that an optically functional favorable liquid crystal/polymer composite layer 5 from the state of the mixed liquid via the process of phase separation. If the phase separation is not sufficient, drawbacks may occur such that the driving voltage to make the liquid crystal operate may increase, or the liquid crystal optical element does not operate. The phase separation structure means a structure in the interior of the liquid crystal cell, formed via the phase separation process and capable of developing electrooptical characteristics and functions.

The microscopic shape of the phase separation structure in the liquid crystal/polymer composite can be variously changed depending upon the type, the characteristics, the mixture ratio etc. of compounds constituting the mixed liquid of a precursor of the liquid crystal/polymer composite layer 5. The combination and the mixture ratio of the materials to be used are determined considering the optical characteristics such as transmission/scattering characteristics, the degree of the driving voltage and the degree of the reliability required as an electrooptical element. The mixed liquid of a precursor of the liquid crystal/polymer composite layer 5 is not particularly limited so long as the above-described liquid crystal/polymer composite layer 5 is obtained, but is formed from one containing a liquid crystal compound and a polymerizable compound. It is preferred to optionally select the type and the mixture ratio of the composition so that the mixed liquid of a precursor forms a uniform liquid crystal layer, in order to obtain a high quality liquid crystal/polymer composite layer 5 having uniform transmission/scattering electrooptical characteristics.

As a preferred mixed liquid of a precursor of the liquid crystal/polymer composite layer 5, one comprising a liquid crystal compound <C>, a first polymerizable compound <A> and a second polymerizable compound <B>, and optionally having a polymerization initiator added thereto, may, for example, be used. As the first polymerizable compound <A>, such a compound is selected that when a composition of the first polymerizable compound <A>, the liquid crystal compound <C> and the polymerization initiator is injected for polymerization between the substrates by a method as described hereinafter, the polymerized polymer forms column resins which are substantially vertical to the normal direction of the substrate plane. As the second polymerizable compound <B>, such a compound is selected that when a composition of the first polymerizable compound <B>, the liquid crystal compound <C> and the polymerization initiator is injected for polymerization between the substrates by a method as described hereinafter, the polymerized polymer forms randomly aligned column resins.

The liquid crystal compound <C> is preferably a non-polymerizable liquid crystal compound. One type each of the first polymerizable compound <A> and the second polymerizable compound <B> may be used, or several types may be used. The polymerized polymer may be a copolymer such as a random copolymer or an alternating copolymer, or homopolymers of the respective monomers. The polymer is preferably a copolymer considering the uniformity of the polymer in the liquid crystal/polymer composite 5. By using the first polymerizable compound <A> and the second polymerizable compound <B>, coexistence of column resins of which the major axis directions substantially agree with the normal direction of the substrate plane and column resins which are aligned on the tilt, can be obtained.

Now, one example of a process for producing the liquid crystal optical element according to the first embodiment of the present invention will be explained below. The production process as explained below is one typical example, and needless to say, another production process may be employed so long as it fulfils the object of the present invention.

In a case where the first substrate 1 and the second substrate 2 are film substrates, the first substrate 1 and the second substrate 2, each equipped with an electrode and continuously supplied, are sandwiched between e.g. two rubber rolls, and a liquid having spacers dispersed in the mixed liquid is supplied and sandwiched between the two substrates, and then continuous polymerization is carried out, whereby high productivity will be obtained.

In a case where the first substrate 1 and the second substrate 2 are glass substrates, a very small amount of spacers are spread on their planes, four sides of the facing substrates are sealed with a sealing agent such as an epoxy resin to form a sealed cell, one of at least two cutouts formed on the sealed portion is immersed into the mixed resin, and the mixed resin is drawn from the other cutoff by suction, so that the liquid crystal cell is filled with the mixed liquid, and polymerization is carried out.

First, on a first substrate 1 and a second substrate 2, a first electrode 3 and a second electrode 4, a first alignment film 8 and a second alignment film 9, etc. are respectively formed. After the alignment films are fired, an alignment treatment such as rubbing is carried out as the case requires. Then, spacers 6 are spread by a spreader on the side of the first substrate 1 on which the alignment film is formed. The second substrate 2 is coated with a sealing agent 7. The first substrate 1 and the second substrate 2 are contact bonded by heating after positioning by means of e.g. an alignment mark is carried out. The space between the substrates after the contact bonding is kept by the spacers 6.

Then, a mixed liquid to be a precursor of a liquid crystal/polymer composite layer 5 is injected between the substrates and sealed. As a sealing means, a known method may be employed.

Then, an external stimulation is applied to the mixed liquid of a precursor of a liquid crystal/polymer composite layer 5 to form a liquid crystal/polymer composite layer 5. The external stimulation may, for example, be irradiation with light rays such as visible light rays, ultraviolet rays or electron rays, or heating. It is preferred to employ irradiation with light with a view to easily controlling the temperature at the time of polymerization. As irradiation with light, it is more preferred to employ ultraviolet rays in view of handling efficiency, easiness in production, etc.

In a case of a so-called photopolymerization phase separation method of subjecting the mixed liquid of a precursor of a liquid crystal/polymer composite layer 5 to phase separation to obtain the liquid crystal/polymer composite layer 5, a high-pressure mercury lamp, a low-pressure mercury lamp or a metal halide lamp may, for example, be used as a light source.

When the mixed liquid of a precursor of a liquid crystal/polymer composite layer 5 is subjected to polymerization by irradiation with light, the irradiation conditions are set in accordance with the type of the polymerizable monomers. When the mixed liquid is directly irradiated, the intensity of the light is preferably from 1 to 400 mW/cm$^2$. If it is less than 1 mW/cm$^2$, the phase separation rate tends to be low and the scattering intensity tends to decrease, and if it exceeds 400 mW/cm$^2$, decomposition tends to occur by a photoreaction, and the retention tends to decrease.

The temperature at the time of irradiation with light is preferably within a temperature range in which the mixed liquid shows a liquid crystal phase. If polymerization is carried out at a temperature of at most the compatible temperature at which the mixed liquid is in a compatible state, there is a fear that phase separation may occur before photopolymerization, and a liquid crystal/polymer composite in which the liquid crystal is in a non-uniform state may be obtained. Further, if the temperature of the mixed liquid is too high, the mixed liquid may undergo phase transition from a liquid crystal phase to an isotropic phase, and the scattering/transmittance electrooptical characteristics of the liquid crystal optical element may not be secured. A preferred range of the liquid crystal temperature in which the mixed liquid shows a liquid crystal phase is from 10 to 60° C., more preferably from 30 to 50° C. The polymerization is carried out preferably in a certain environment by using e.g. a thermostatic chamber, so that the entire plane of the liquid crystal optical element 10 is subjected to polymerization under uniform conditions (irradiation, polymerization temperature).

The polymerization initiator may optionally be selected from known polymerization catalysts. In the case of photopolymerization, a photopolymerization initiator commonly used for photopolymerization, such as a benzoin ether type, an acetophenone type or a phosphine oxide type may be used. In the case of thermal polymerization, a thermal polymerization initiator such as a peroxide type, a thiol type, an amine type or an acid anhydride type may be used depending upon the polymerization site, and as the case requires, a curing aid such as an amine may be used.

The content of the polymerization initiator is usually from 0.1 to 20 parts by weight, preferably from 0.1 to 10 parts by weight, based on the total amount of 100 parts by weigh of the polymerizable monomers. When a polymer (polymerized product) after polymerization is required to have a high molecular weight or a high resistivity, the content is more preferably from 0.1 to 5 parts by weight. If the content of the polymerization initiator exceeds 20 parts by weight, compatibility of the mixed liquid tends to be impaired.

Further, if the content of the polymerization initiator is less than 0.1 part by weight, the polymerizable monomers contained in the mixed liquid may not adequately polymerized, and no desired phase separation structure will be formed.

Accordingly, it is preferred that the above range is satisfied. Further, in order to improve the contrast ratio of the liquid crystal optical element under application/non-application of an electric field, a known chiral agent may be added to the mixed liquid.

Now, the second embodiment of the present invention will be explained below. This is to develop desired mechanical characteristics by selection and combination of materials used.

In the liquid crystal optical element according to the second embodiment of the present invention, a liquid crystal/polymer composite layer formed by phase separation of a liquid crystal and a polymer is a main constituting element to develop optical functions. It is important that an optically functional favorable structure is formed from the state of a mixture via the process of phase separation. If the phase separation is not sufficient, drawbacks may occur such that the driving voltage to make the liquid crystal operate may increase, or the liquid crystal optical element does not operate.

The microscopic shape of the phase separation structure in the liquid crystal/polymer composite can be variously changed depending upon the type, the characteristics, the mixture ratio etc. of the liquid crystal compound, polymerizable compound and non-polymerizable compound used. The combination and the mixing ratio of the materials to be used are determined considering the optical characteristics such as transmission/scattering characteristics, the degree of the driving voltage and the degree of the reliability required as an electrooptical element. The phase separation structure means a structure in the interior of the liquid crystal cell, formed via the phase separation process and capable of developing electrooptical characteristics and functions.

Further, in order to obtain a high quality liquid crystal/polymer composite having uniform transmission/scattering electrooptical characteristics, the mixer containing at least a liquid crystal compound and polymerizable monomers is preferably a homogeneous solution after mixing.

When a mixture is blended, if the content of the polymerizable monomers is high, the mixed liquid may separate. Accordingly, a favorable phase separation structure will hardly be obtained, and the obtained product may not be used as a liquid crystal optical element. Further, if the content of the polymerizable monomers is high, the mixture (usually in a state of a mixed liquid) may not have compatibility, and the phase separation temperature tends to rise, and further, the phase transition temperature from the liquid crystal phase to the isotropic phase tends to lower. Accordingly, the temperature range in which the mixture shows a liquid crystal phase tends to be narrow. Accordingly, it is preferred to optionally select the type and the mixture ratio of the compositions so that the mixture shows a uniform liquid crystal phase.

In the present invention, when a liquid crystalline mixture (D) is held in a liquid crystal state between alignment films, the mixture (D) is in an alignment state of e.g. horizontal alignment, twist alignment, hybrid alignment or vertical alignment, depending upon the type (alignment power) of the alignment film. The polymerizable compounds in the mixture (D) are polymerized in such an alignment state to form a polymer.

By such a process, the polymer and the liquid crystalline composition (C) undergo phase separation, whereby a liquid crystal/polymer composite can be formed. At this time, a bifunctional polymerizable compound (A) is selected so that the molecular alignment in the polymer before the polymerization can be kept. In order to keep the alignment before and after the polymerization phase separation process, compatibility between the liquid crystalline composition (C) and the bifunctional polymerizable compound (A) is favorable.

On the other hand, in order that the polymer formed after the polymerization undergoes favorable phase separation from the liquid crystalline composition (C), the bifunctional polymerizable compound (A) is preferably not liquid crystalline. As the alignment state, any of the above alignment states may be taken. Vertical alignment is preferred in order to improve transparency under application of no voltage of a finished liquid crystal optical element. In the case of vertical alignment, alignment drawbacks resulting from the spacers can be reduced, since the transparency of the liquid crystal optical alignment will more improve. In production of the liquid crystal optical element of the present invention, the polarity of the dielectric anisotropy of the liquid crystal composition may be positive or negative. It is preferably negative in the case of vertical alignment, and is preferably positive in other cases.

In the liquid crystal optical element of the present invention, a polymer compound forming the liquid crystal/polymer composite is a polymerized product derived from a mixture at least containing at least one type of the above bifunctional polymerizable compound (A), at least one type of the above bifunctional polymerizable compound (B) and a non-polymerizable liquid crystalline composition (C). The bifunctional polymerizable compound (A) forms a main skeleton component having stiffness in the polymer compound. Further, the bifunctional polymerizable compound (A) has such properties that at the time of phase separation with the liquid crystalline composition (C), it undergoes phase separation while the direction of skeleton moieties $Q_1$, $Q_2$, $Q_3$ and $Q_4$ of the compound (A) keep in conformity with the skeleton moiety of the liquid crystal compound (C), and accordingly it has such an effect to form a column resin structure. On the other hand, the bifunctional polymerizable compound (B) forms a flexible component capable of playing a role as a shock absorber in the polymer compound.

Further, the bifunctional polymerizable compound (B) has no skeleton moiety $Q_1$, $Q_2$, $Q_3$ nor $Q_4$ and therefore it has no directional properties with respect to the phase separation with the liquid crystalline composition (C), and thus it has an effect to make the resin structure to be formed be branched or inclined. By combining such compounds having different physical properties, a liquid crystal/polymer composite having favorable impact resistance as an electrooptical element can be formed.

Now, the bifunctional polymerizable compound (B) used in the present invention will be explained in further detail below. The bifunctional polymerizable compound (B) is not particularly restricted so long as it is a compound of the formula (2). It may, for example, be a compound which satisfies the following conditions:

A compound, wherein each of $A_3$ and $A_4$ which are independent of each other, is an acryloyloxy group, a methacryloyloxy group or a vinyl ether group, $R_3$ is —$R_4$— or ($R_5$—O)$_n$—$R_5$—, wherein $R_4$ is a $C_{2\text{-}20}$ linear or branched alkylene group, $R_5$ is a $C_{2\text{-}8}$ linear or branched alkylene group, and n is an integer of from 1 to 10, or wherein $R_4$ is a $C_{2\text{-}20}$ linear alkylene group, $R_5$ is —(CH$_2$)r—, —CH$_2$—CH(CH$_3$)—, —CH$_2$—CH$_2$—CH(CH$_3$)— or CH$_2$—CH$_2$—(CH$_3$)$_2$— (wherein r is an integer of from 2 to 5), and n is an integer of from 1 to 6.

A liquid crystal optical element employing such a bifunctional polymerizable compound (B) has high impact resistance and is preferred. The bifunctional polymerizable compound (B) may be used alone or two or more of them may be used in combination. Specific examples thereof are shown by the following formulae (3) to (7):

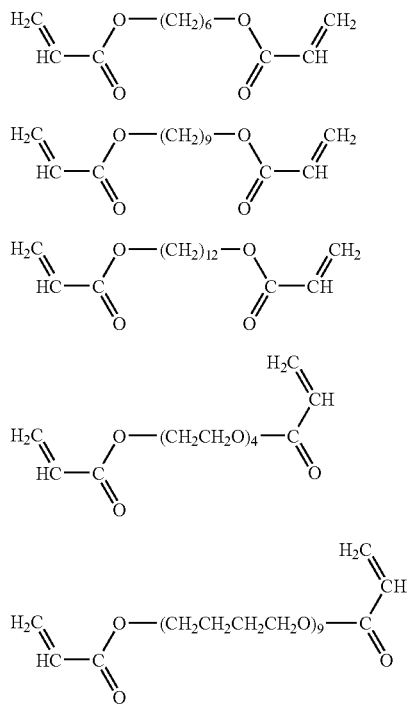

The bifunctional polymerizable compound (B) has polymerizable groups $A_3$ and $A_4$ and has $R_3$ which connects the polymerizable groups. $R_3$ is selected from groups having a single bond between atoms and having a high degree of freedom of the intermolecular rotation. Such a constitution improves flexibility of the polymerized polymer, and contributes to an increase in reactivity of the polymer phase separation.

The larger the number of the carbon atoms between $A_3$ and $A_4$ and the number of ethereal oxygen atoms, the more the flexibility improves. On the other hand, the compatibility with the liquid crystalline composition (C) tends to decrease when the number of atoms is large. Accordingly, the number of atoms is properly selected. Further, when a production process of injecting the mixed liquid into a liquid crystal cell in vacuum is employed, the number of carbon atoms is at least 8, preferably at least 11, taking flying of volatile components from the mixed liquid into consideration. An ethereal oxygen atom may be contained or may not be contained. An ethereal oxygen atom is preferably contained, which improves flexibility of the polymer.

The bifunctional polymerizable compound (B) contains no group such as $Q_1$ in its molecule, and accordingly it is relatively easy to increase the number of carbon atoms contained in $R_3$. Such a structure greatly contributes to improvement in flexibility of the polymer.

Now, the bifunctional polymerizable compound (A) will be explained below. The bifunctional polymerizable compound (A) is not particularly restricted so long as it is a compound which satisfies the conditions of the compound (1). Such a compound is sometimes called a mesogen monomer, a liquid crystal monomer or a polymerizable liquid crystal, however, the bifunctional polymerizable compound (A) is not necessarily limited to such compounds, and one having favorable solubility in the non-polymerizable liquid crystalline composition (C) is selected and used.

For example, a known compound as disclosed in e.g. JP-A-4-227684 may optionally be selected. One having such a structure has improved solubility in the liquid crystal composition (C). Further, the bifunctional polymerizable compound (A) preferably has the following structure.

The bifunctional polymerizable compound (A) represented by the formula (1) is preferably a compound which satisfies the following conditions:

each of $A_1$ and $A_2$ which are independent of each other, is an acryloyloxy group, a methacryloyloxy group or a vinyl ether group;

each of $Q_1$, $Q_2$, $Q_3$ and $Q_4$ which are independent of one another, is a 1,4-phenylene group which may have a substituent, or a 1,4-cyclohexylene group;

each of $X_1$ and $X_2$ which are independent of each other, is a single bond, an oxygen atom or an ester linkage;

each of $R_1$ and $R_2$ which are independent of each other, is a single bond or a linear or branched $C_{2-20}$ alkylene group which may have one or more ethereal oxygen atoms between carbon atoms;

each of $Z_1$, $Z_2$ and $Z_3$ which are independent of one another, is a single bond, —C(=O)—O—, —O—C(=O)—, —CH$_2$—CH$_2$—, —C≡C—, —CH$_2$—O— or —O—CH$_2$—; and each of p and q is 0, or one is 0 and the other is 1.

Further, the bifunctional polymerizable compound (A) represented by the formula (1) is preferably a compound which satisfies the following conditions:

each of $A_1$ and $A_2$ which are independent of each other, is an acryloyloxy group or a methacryloyloxy group;

each of $Q_1$ and $Q_2$ is a 1,4-phenylene group which may have a substituent, and each of $Q_3$ and $Q_4$ which are independent of each other, is a 1,4-phenylene group which may have a substituent, or a 1,4-cyclohexylene group;

each of $Z_1$, $Z_2$ and $Z_3$ which are independent of one another, is a single bond, —C(=O)—O—, —O—C(=O)—, —CH$_2$—CH$_2$— or —C≡C—; and each of p and q is 0, or one is 0 and the other is 1.

Further, the bifunctional polymerizable compound (A) represented by the formula (1) is preferably a compound which satisfies the following conditions:

each of $A_1$ and $A_2$ is an acryloyloxy group;

each of $Q_1$ and $Q_2$ is a 1,4-phenylene group which may have a substituent, and each of $Q_3$ and $Q_4$ which are independent of each other, is a 1,4-phenylene group which may have a substituent, or a 1,4-cyclohexylene group;

each of $R_1$ and $R_2$ which are independent of each other, is a linear or branched $C_{2-20}$ alkylene group;

$Z_1$ is a single bond, —C(=O)—O—, —O—C(=O)—, —CH$_2$—CH$_2$— or —C≡C—, and each of $Z_2$ and $Z_3$ is a single bond, and each of p and q is 0, or one is 0 and the other is 1.

As specific examples of the bifunctional polymerizable compound (A) to form the liquid crystal/polymer composite used in the liquid crystal optical element of the present invention, compounds of the following formulae (8) to (11) may, for example, be mentioned:

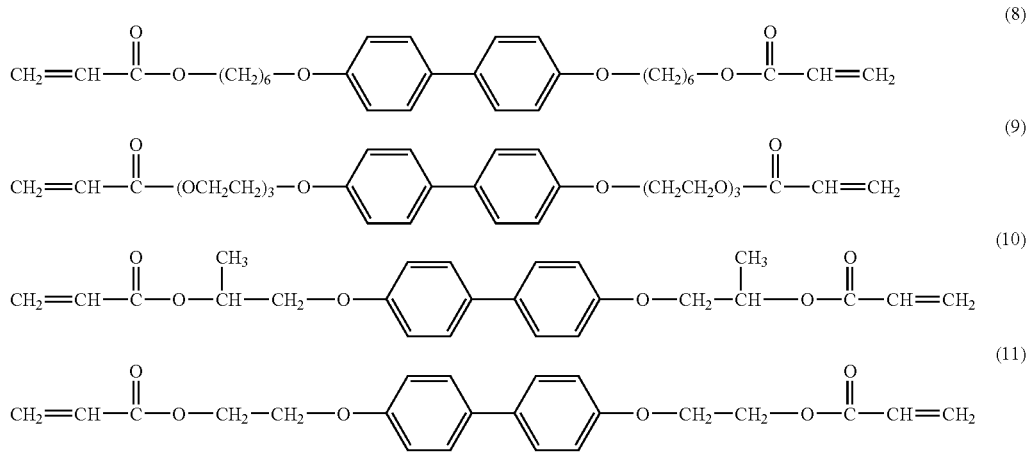

The bifunctional polymerizable compound (A) is classified into a compound having liquid crystallinity and a compound having no liquid crystallinity from its properties. In the present invention, it is preferred that the mixed liquid is in a stale liquid crystal phase, and a liquid crystal/polymer composite is formed by phase separation from the state of the liquid crystal phase. In order that the phase separation process is likely to take place, a non-liquid crystalline bifunctional polymerizable compound (A) is preferably contained in a mixture showing liquid crystal phase. As the non-crystalline bifunctional polymerizable compound (A), the compounds of the above formulae (8) to (11) may be mentioned. As a compound which makes the mixed liquid have favorable miscibility, the acrylate compounds of the formulae (8) and (10) may be mentioned.

As explained above, the bifunctional polymerizable compound (A) may be used alone or two or more of them may be used in combination. A bifunctional polymerizable compound (A) having liquid crystallinity is a material which is less likely to undergo phase separation in view of the phase separation process, however, it makes the liquid phase temperature range wide and thereby makes handling of the mixture easy, with a view to controlling the state of the mixture. As specific compounds which satisfy such conditions, the following formulae (12) and (13) may be mentioned:

In the present invention, the bifunctional polymerizable compound (A) having liquid crystallinity can be used as one component in the mixture. Namely, in addition to a case where the bifunctional polymerizable compound (A) having no crystallinity alone may be used, the bifunctional polymerizable compound (A) having no crystallinity and the bifunctional polymerizable compound (A) having liquid crystallinity may be combined, or the bifunctional polymerizable compound (A) having liquid crystallinity may be used by itself.

Further, the bifunctional polymerizable compound (A) has an organic group having $Q_1$, $Q_2$, $Q_3$ and $Q_4$ connected by connecting groups $Z_1$, $Z_2$ and $Z_3$, as a skeleton. The organic group is helpful to improve the compatibility between the bifunctional polymerizable compound (A) and the liquid crystalline composition (C) and to widen the temperature range in which the liquid crystalline mixture (D) shows liquid crystallinity (hereinafter referred to as liquid crystal temperature range).

Further, each of p and q which are independent of each other, is 0 or 1. When both are 0, the temperature at the time of mixing can be lowered when the liquid crystalline mixture (D) is prepared, and unnecessary polymerization of polymerizable moieties represented by $A_1$, $A_2$, $A_3$ and $A_4$ can be reduced.

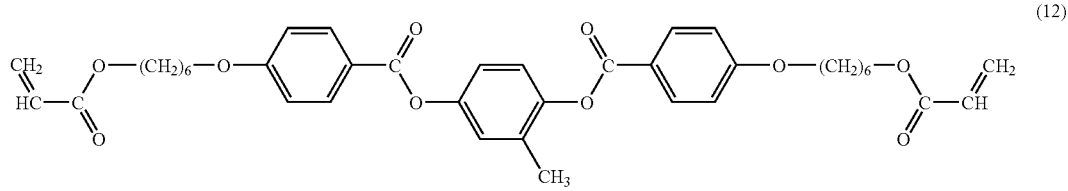

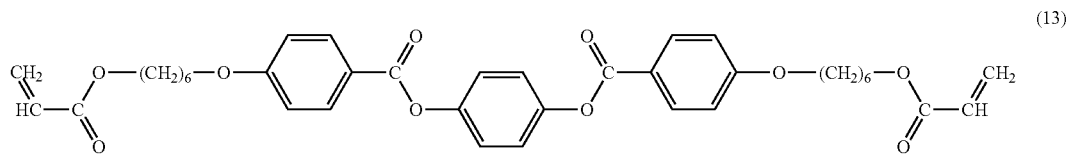

Further, the above organic group has an optical anisotropy of at least 0.01. The optical anisotropy tends to be high when a 1,4-phenylene group which may have a substituent or a pyrimidine-2,5-diyl group is employed. The optical anisotropy tends to be low when a 1,4-cyclohexylene group is employed. Further, when connecting groups $Z_1$, $Z_2$ and $Z_3$ are —C≡C—, the optical anisotropy can be made particularly high.

Further, the larger the moiety other than the skeleton in the molecule of the bifunctional polymerizable compound (A) i.e. the size of $A_1$, $A_2$, $R_1$, $R_2$, $X_1$, and $X_2$, the more the optical anisotropy tends to decrease. As mentioned above, the optical anisotropy can be controlled, and the degree is determined by the degree of the anisotropy of the liquid crystal composition (C) to be combined. For example, when the optical anisotropy of the liquid crystal composition (C) is high, the optical anisotropy of the bifunctional polymerizable compound (A) is made high. On the other hand, when the optical anisotropy of the liquid crystal composition (C) is low, the optical anisotropy of the bifunctional polymerizable compound (A) is made low.

In such a manner, transparency of the liquid crystal optical element under application of no voltage will improve. Further, the bifunctional polymerizable compound (B) is a compound having no such organic group and therefore has such an effect to lower the optical anisotropy of the bifunctional polymerizable compound (A). Accordingly, a compound is selected taking optical anisotropy of the bifunctional polymerizable compound (A) into consideration, depending upon the addition amount of the bifunctional polymerizable compound (B).

Further, connecting groups $R_1$, $R_2$, $X_1$ and $X_2$ have a role to connect the polymerizable groups $A_1$ and $A_2$ and the organic groups. The connecting group is selected from groups having a single bond between atoms and having a high degree of freedom of the intermolecular rotation. By such a constitution, the collision probability among the polymerizable groups $A_1$, $A_2$, $A_3$ and $A_4$ in the molecule increases and the reactivity increases, whereby a polymer with high reliability will be obtained.

Further, by increasing the carbon number or the number of ethereal oxygen atoms of $R_1$, $R_2$, $X_1$ and $X_2$, flexibility of the bifunctional polymerizable compound can be improved. However, along with the increase in the molecular weight, preparation of the compound and purification or isolation with high purity tend to be difficult, and thus the increase is limited.

As explained above, the bifunctional polymerizable compound (A) improves the compatibility with the liquid crystalline composition (C) and adjusts the optical characteristics of the liquid crystal/polymer composite. On the other hand, a polymer formed from the bifunctional polymerizable compound (A) has low flexibility, and the formed liquid crystal/polymer composite has a column structure and therefore tends to be weak against impact.

As the liquid crystal compound to be used in the present invention, various liquid crystal compounds used as a common display material or used as a material of a field drive display element, such as a nematic liquid crystal, a cholesteric liquid crystal, a smectic liquid crystal or a ferroelectric liquid crystal, may be used. Specifically, various liquid crystal compounds such as a biphenyl type, a phenylbenzoate type, a cyclohexylbenzene type, an azoxybenzene type, an azobenzene type, an azomethine type, a terphenyl type, a biphenyl benzoate type, a cyclohexyl biphenyl type, a phenyl pyridine type, a cyclohexyl pyrimidine type and a cholesterol type may be mentioned.

The liquid crystal compound is not necessarily used alone but two or more types of liquid crystal compounds may be used in combination, similar to a commonly used liquid crystal compound. Further, for the purpose of display by an electric field, it is preferred to use one having negative dielectric anisotropy among the above liquid crystal compounds. Further, in order to decrease the driving voltage, it is preferred to use one having a high absolute value of the dielectric constant. As a liquid crystal compound having a high absolute value of the dielectric anisotropy, a compound having a cyano group or a halogen atom such as fluorine or chlorine as a substituent is used in view of chemical stability. A compound having a cyano group as a substituent is used when a decrease in driving voltage is important, and a compound having a fluorine atom as a substituent is used when reliability is important.

In the present invention, as the compounding ratio of the bifunctional polymerizable compound (A), the bifunctional polymerizable compound (B) and the liquid crystalline composition (C), it is preferred that the liquid crystalline composition (C) is from 50 to 94.5%, the bifunctional polymerizable compound (A) is from 5 to 45%, and the bifunctional polymerizable compound (B) is from 0.5 to 15%. More preferably, the liquid crystalline composition (C) is from 75 to 90%, the bifunctional polymerizable compound (A) is from 5 to 15%, and the bifunctional polymerizable compound (B) is from 0.5 to 10%. If the total amount of the bifunctional polymerizable compound (A) and the bifunctional polymerizable compound (B) is too small, the scattering intensity, the impact resistance, the voltage resistance and the reliability may decrease.

If the total amount of the bifunctional polymerizable compound (A) and the bifunctional polymerizable compound (B) is too large, the transparency may decrease, or the driving voltage may increase. If the amount of the bifunctional polymerizable compound (B) is too small, the flexibility and the resin structure are not appropriate, and thus the impact resistance tends to decrease. If the amount of the bifunctional polymerizable compound (B) is too large, the transparency may decrease, or the uniform state of the liquid crystalline mixture (D) may not be maintained.

By such a formulation, the mixture is likely to be controlled as a stable liquid crystal phase in the production process. If the relative amount of the polymerizable monomer is larger than the above range, the liquid crystalline composition and the polymerizable monomer tend to undergo phase separation, and thus the above range is preferably satisfied.

Further, if the relative amount of the polymerizable monomer is large, the temperature at which the mixture undergoes phase separation tends to rise, the phase transition temperature from the liquid crystal phase to the isotropic phase tends to lower. Accordingly, the liquid crystal temperature range in which the mixture shows a liquid crystal phase tends to be narrow. Accordingly, the above range is preferably satisfied.

The mixture containing the liquid crystalline compound and the polymerizable monomer is preferably a homogeneous mixed solution after mixing. In order that the mixed solution shows a liquid crystal phase, the type and the mixture ratio of the compounds or the compositions may optionally be selected. The mixed solution has only to show a liquid crystal phase as the whole mixed solution at least when the polymerizable compounds are polymerized in a process of phase separation.

In the present invention, in order to polymerize the polymerizable monomers, it is preferred to use a polymerization initiator. The polymerization initiator may optionally be selected from known polymerization catalysts, and in a case where a photopolymerization phase separation method is employed, a photopolymerization initiator which is commonly used for photopolymerization, such as a benzoin ether type, an acetophenone type or a phosphine oxide type may be used.

In the case of thermal polymerization, a thermal polymerization initiator such as a peroxide type, a thiol type, an amine type or an acid anhydride type may be used depending upon the type of the polymerization site, and as the case requires, a curing aid such as an amine may be used.

The content of the polymerization initiator is usually from 0.1 to 20 parts by weight, preferably from 0.1 to 10 parts by weight, based on the total amount of 100 parts by weigh of the polymerizable monomers. When a polymer (polymerized product) after polymerization is required to have a high molecular weight or a high resistivity, the content is more preferably from 0.1 to 5 parts by weight. If the content of the polymerization initiator exceeds 20 parts by weight, compatibility of the mixed liquid tends to be impaired. Further, if the content of the polymerization initiator is less than 0.1 part by weight, the polymerizable monomers contained in the mixed liquid may not adequately polymerized, and no desired phase separation structure will be formed. Accordingly, it is preferred that the above range is satisfied. Further, in order to improve the contrast ratio of the liquid crystal optical element under application/non-application of an electric field, a known chiral agent may be added to the mixed solution.

The liquid crystal optical element of the present invention has a liquid crystal polymer composite as an essential component. The liquid crystal/polymer composite may be used as a display device or an optical modulating device, even when it is constituted only by three components of the liquid crystal compound, the bifunctional polymerizable compound (A) and the bifunctional polymerizable compound (B).

Further, for the purpose of improving the contrast ratio or the stability, various compounds may be added. For example, for the purpose of improving the contrast, a dichroic dye such as an anthraquinone type, a styryl type, an azomethine type or an azo type may be used. In such a case, the dichroic dye is preferably basically compatible with the liquid crystal compound and is incompatible with the polymer compound. In addition, an antioxidant, an ultraviolet absorber or a plasticizer may also be preferably used with a view to improving stability and durability.

Now, the liquid crystal optical element according to the second embodiment will be explained below. The basic structure of the liquid crystal optical element according to the second embodiment is the same as the liquid crystal optical element according to the first embodiment (FIG. 1).

In a case where the dielectric anisotropy of the liquid crystal composition (C) is positive, the alignment direction of the liquid crystal is preferably horizontal alignment. In a case where the dielectric anisotropy is negative, vertical alignment is preferred. In the case of horizontal alignment, the alignment irregularities can be decreased by rubbing. In the case or vertical alignment, the degree of the alignment irregularities is low even without rubbing, however, rubbing may be carried out. In the case of rubbing, the combination of rubbing angles may be either parallel or at right angles, and the angle is set so that the degree of irregularities when the mixed liquid is sandwiched between the substrates will be minimum.

The thickness of the liquid crystal/polymer composite layer 5 between the first electrode 3 and the second electrode 4 is kept preferably by spacers. The material of the spacers to be used, the shape of the spacers and the thickness of the liquid crystal/polymer composite layer 5 are as explained for the first embodiment of the present invention.

Now, the process for producing the liquid crystal optical element of the present invention will be explained below. Preliminarily, polymerizable monomers including the bifunctional polymerizable compound (A) and the bifunctional polymerizable compound (B), a liquid crystalline compound and a polymerization initiator are mixed to form a mixed solution (hereinafter sometimes referred to simply as "mixed liquid"). Then, the temperature of the mixed liquid is raised so that the mixed liquid is in a uniformly mixed state as an isotropic phase. Then, the temperature of the mixed liquid is lowered, the mixed liquid being in a liquid crystal phase is confirmed, to adjust the mixed liquid.

Then, the mixed liquid is sandwiched between a pair of a first substrate 1 and a second substrate 2, each equipped with an electrode. As the sandwiching method, for example, a method of coating one of the substrates with electrodes (such as the second substrate 2 with the second electrode 4) with the mixed liquid in a certain thickness, and overlaying the other substrate with a electrode (such as the first substrate 1 with the first electrode 3) so that the first electrode 3 is in contact with the surface of the mixed liquid, may be mentioned. Otherwise, the mixed liquid is injected between two substrates equipped with electrodes i.e. the first substrate 1 and the second substrate 2 by means of e.g. a vacuum injection method and sandwiched.

Then, in a thermostatic state by using e.g. a thermostatic chamber, the mixed liquid is heated or irradiated with e.g. light or electron beams and polymerized. Particularly, it is preferred to employ a photopolymerization phase separation method by irradiation with e.g. ultraviolet rays or visible rays, whereby the temperature during the polymerization can easily be controlled.

In a case where the liquid crystal/polymer composite is formed by a photopolymerization phase separation method from a mixed liquid, irradiation with light may be carried out so that the predetermined polymerization phase separation takes place, and the conditions are not particularly limited. Under normal production conditions, a light source which emits a light having a wavelength of at most 400 nm is preferred. For example, a high-pressure mercury lamp, a low-pressure mercury lamp or a metal halide lamp may be used.

The conditions of irradiation with light are set preferably in accordance with the type of the polymerizable monomers. When the mixed liquid is directly irradiated, the intensity of the irradiation light is preferably from 1 to 400 $mW/cm^2$ (measured at a wavelength of 365 nm). If it is less than 1 $mW/cm^2$, the phase separation rate tends to be low and the scattering intensity tends to decrease. If it exceeds 400 $mW/cm^2$, decomposition tends to occur by a photoreaction, and the retention tends to decrease.

The temperature at the time of irradiation is optionally selected and set from the liquid crystal temperature range of the mixed liquid. The liquid crystal temperature range in which the mixed liquid can show a liquid crystal phase varies depending upon the type and the compounding ratio of the compositions in the mixed liquid. For example, it is preferably from 10 to 60° C., more preferably from 30 to 50° C., to carry out the present invention. At a temperature of at most the compatible temperature at which the mixed liquid is in a compatible state, phase separation may occur before photopolymerization, and a liquid crystal/polymer composite in which the liquid crystal is in a non-uniform state may be obtained. On the other hand, if the temperature is too high, the mixed liquid may undergo phase transition from a liquid crystal phase to an isotropic phase, and the scattering/transmittance electrooptical characteristics of the liquid crystal optical element may not be secured.

When the mixed liquid is exposed for polymerization, it is preferred to employ a method such as exposure in the air, exposure in nitrogen or exposure in water, in order that the entire plane of the liquid crystal optical element 10 is subjected to polymerization under uniform conditions (irradiation, polymerization temperature).

EXAMPLE 1

Now, the present embodiment will be explained more specifically with reference to Examples, but the present invention is by no means restricted thereto. "Part(s)" in Examples means "part(s) by weight".

As a mixed liquid of a procure to be used for a liquid crystal/polymer composite layer according to Example 1,
<1> 85 parts of a nematic crystal having negative dielectric anisotropy (Tc=102° C., $\Delta\epsilon$=−2.8, $\Delta n$=0.21),
<2> 13 parts of a polymerizable compound of the above formula (8),
<3> 2 parts of a polymerizable compound of the above formula (7) and
<4> benzoin isopropyl ether as a photopolymerization initiator, were used. As the amount of the photopolymerization initiator, 3 parts were mixed based on the total amount of 100 parts of the photopolymerizable compounds <2> and <3>.

Then, the mixed liquid was heated to 90° C. with stirring so that the mixed liquid was in an isotropic phase and uniform, and then the temperature was lowered to 60° C. Then, the mixed liquid being in a liquid crystal phase was confirmed, and the mixed liquid was held at a temperature at which a liquid crystal phase was formed.

A liquid crystal cell was prepared as follows. First, a pair of substrates comprising a transparent electrode and a polyimide thin film for vertical alignment formed on the electrode, was prepared. Then, the pair of the substrates were bonded so that the polyimide thin films formed on the substrate planes faced each other, to form a liquid crystal cell. Specifically, a very small amount of resin beads (diameter 6 μm) were spread, and to four sides of the substrates, an epoxy resin (peripheral seal) printed with a width of about 1 mm was bonded to form a liquid crystal cell. Then, the mixed liquid was injected into the liquid crystal cell.

Then, in a state where the liquid crystal cell was held at 33° C., by means of a HgXe lamp with a dominant wavelength of about 365 nm, the liquid crystal cell was irradiated with ultraviolet rays from one substrate plane side of the pair of the substrates at 10 mW/cm², and from the other substrate plane side at about 10 mW/cm², for 10 minutes. In such a manner, a liquid crystal/polymer composite layer was formed from the mixed liquid via the polymerization phase separation process, and a liquid crystal optical element having reverse mode transmittance/scattering characteristics was obtained.

COMPARATIVE EXAMPLE A

In Comparative Example A, as a mixed liquid of a precursor to be used for a liquid crystal/polymer composite layer, 80 parts of a nematic crystal having negative dielectric anisotropy as the above <1>, 20 parts of a polymerizable compound of the above formula (8) as the above <2> and a photopolymerization initiator as the above <4>, were used. As the amount of the photopolymerization initiator, 3 parts were mixed based on the total amount of 100 parts of the photopolymerizable compound <2>.

Then, the mixed liquid was heated to 90° C. with stirring so that the mixed liquid was in an isotropic phase and uniform, and then the temperature was lowered to 60° C. Then, the mixed liquid being in a liquid crystal phase was confirmed, and the mixed liquid was held at a temperature at which a liquid crystal phase was formed. A liquid crystal cell was prepared in the same manner as mentioned above.

The liquid crystal cell having the mixed liquid of Comparative Example A injected thereinto in a state where it was held at 40° C., was irradiated with ultraviolet rays from one substrate plane side of the pair of the substrates at 1 mW/cm², and from the other substrate plane side at about 1 mW/cm², for 10 minutes, by means of a HgXe lamp with a dominant wavelength of about 365 nm. Under the same conditions as in Example except for the above, a liquid crystal/polymer composite layer was formed via the polymerization phase separation process, and a liquid crystal optical element showing reverse mode optical characteristics was formed.

(SEM Photograph)

Figure 3A:
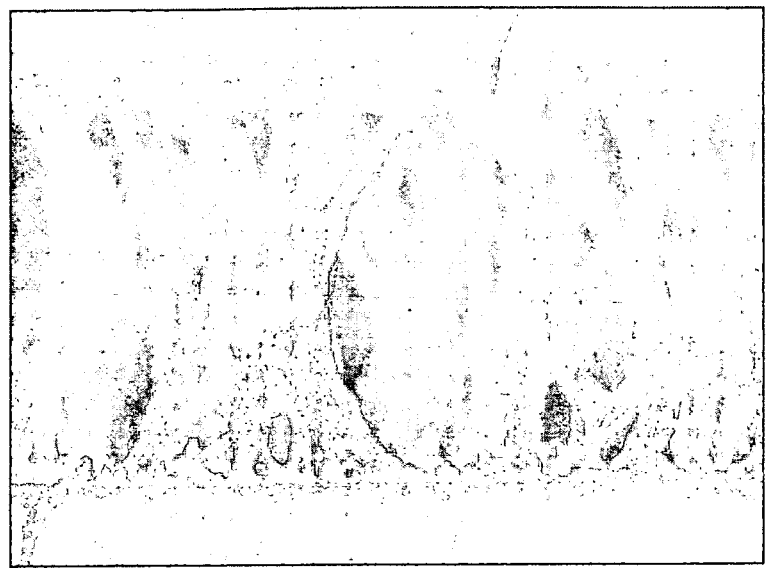
FIG. 3(a) is a sectional view illustrating the polymer shape in the liquid crystal/polymer composite layer according to Example 1.
Figure 3B:
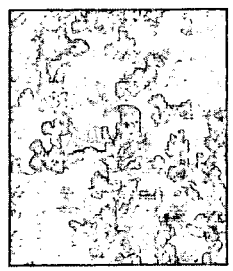
FIG. 3(b) is a perspective view illustrating the polymer shape in the liquid crystal/polymer composite layer according to Example 1.
Figure 4A:
FIG. 4(a) is a top view illustrating the polymer shape in the liquid crystal/polymer composite layer according to Comparative Example A.

FIG. 3(a) is a sectional view illustrating the polymer shape in the liquid crystal optical element according to Example 1, and FIG. 3(b) is a perspective view illustrating the polymer shape in the liquid crystal optical element according to Example. Further, FIG. 4(a) is a sectional view illustrating the polymer shape in the liquid crystal optical element according to Comparative Example A, and FIG. 4(b) is a perspective view illustrating the polymer shape in the liquid crystal optical element according to Comparative Example.

A method of preparing samples used for taking a photograph for FIGS. 3 and 4 will be explained below. For FIGS. 3(a) and 4(a), the outer surfaces of the substrates (the first substrate and the second substrate) of the cell were scratched, the cell was cut up into small pieces 1 cm square (a size of about 1 cm×1 cm), and among the small pieces, a cut sample, on one side of which the peripheral seal remained, was selected, immersed in hexane for about two days and dried for about half a day, and the cut surface was photographed.

Figure 4B:
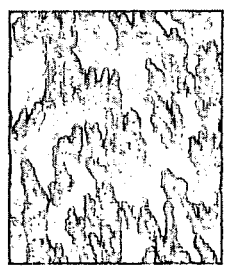
FIG. 4(b) is a perspective view illustrating the polymer shape in the liquid crystal/polymer composite layer according to Comparative Example.

For FIGS. 3(b) and 4(b), the cell was cut up into small square pieces, a cut sample of which the outer four sides were cut surfaces was selected, the liquid crystal in the cell was replaced in the same manner as mentioned above and then, one of the substrates was peeled, and the sample was photographed from an obliquely upward direction (30°) from the substrate plane.

At that time, the column resins are divided substantially equally on the two substrates (the column resins are likely to be divided at their bottoms), and thus about half the column resins remain on one substrate. For FIGS. 3(b) and 4(b), photographs were taken with respect to a portion at which the column resins had the original density. At that time, in FIGS. 3(b) and 4(b), the shape of the column resins is considered to be substantially kept.

In the above Examples, as the polymerizable compounds, no oligomer was used but polymerizable monomers alone were used. Accordingly, the polymer formed by polymerization is less likely to swell in hexane, and the "structure of the polymer" after the liquid crystal is removed from the liquid crystal cell can be observed with good reproducibility.

The polymer in the liquid crystal optical element of Example 1 forms a plurality of assemblies of the column resins as shown in FIG. 3(a). As the column resins, resins of which the major axis directions substantially agree with the normal direction of the substrate plane and resins which are aligned on the tilt, coexist. As evident from FIG. 3(a), the column resins have a branched structure. Among the column resins, resins which were aligned on the tilt had an average tilt angle of about 25°. Further, the tilt azimuth shows no anisotropy, and the resins are aligned in every azimuth. Further, the area occupied by the column resins in the liquid crystal/polymer composite layer 5 on the horizontal plane to the substrate plane, was designed to decrease as the distance from the vicinity of the substrate increases. The diameter of the obtained column resins was about 0.2 μm.

Further, as shown in FIG. 3(b), the polymer in the liquid crystal optical element of Example 1 has an axial core which substantially agrees with the normal direction of the substrate plane, and a plurality of assemblies of column resins such that the area occupied by the column resins in the liquid crystal/polymer composite layer on the horizontal plane to the substrate plane, decrease as the distance from the vicinity of the substrate increases, are formed. The assemblies of the column resins are connected to one another to form a liquid crystal domain region among the assemblies.

The polymer in the liquid crystal optical element of Comparative Example A forms a plurality of assemblies of column resins as shown in FIGS. 4(a) and 4(b). The major axis directions of the column resins substantially agree with the normal direction of the substrate plane.

(Evaluation Test 1)

Figure 5:
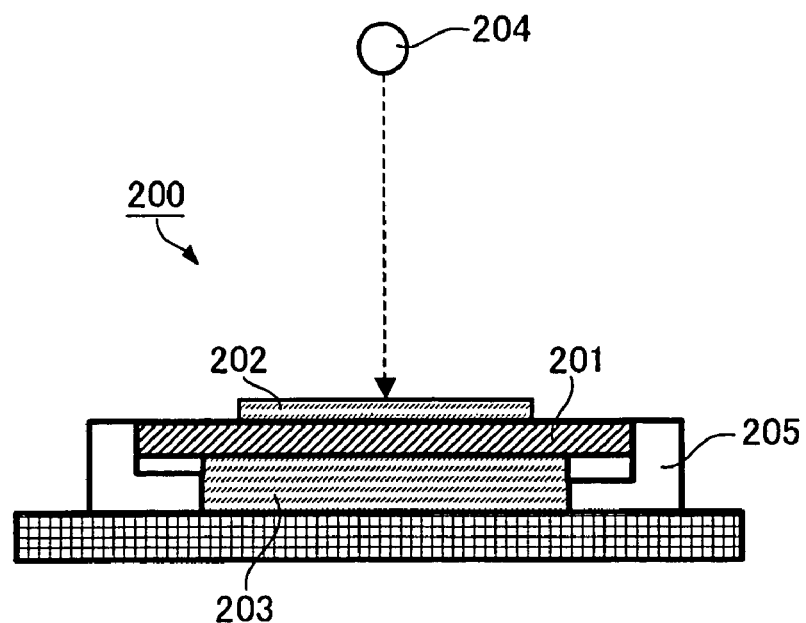
FIG. 5 is a sectional view schematically illustrating an evaluation apparatus to evaluate the impact resistance of the liquid crystal optical element of the present invention.
Figure 6:
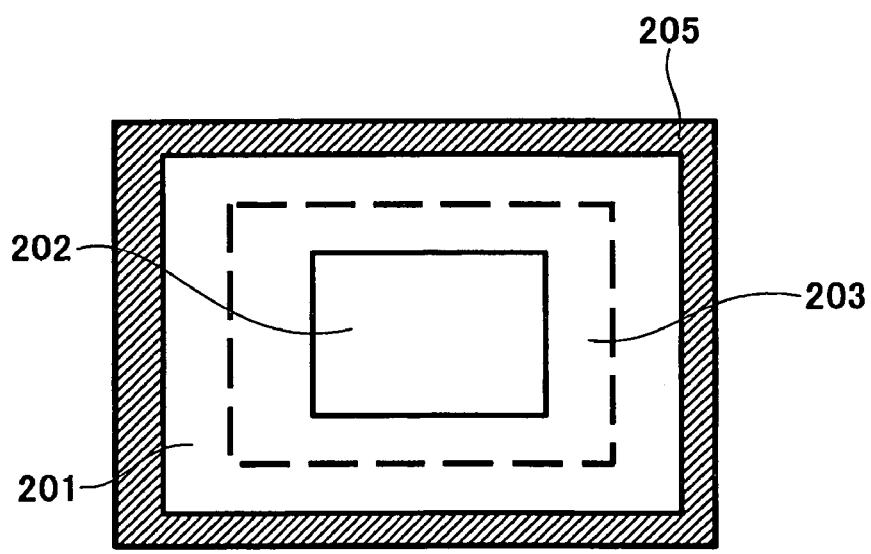
FIG. 6 is a plan view schematically illustrating an evaluation apparatus to evaluate the impact resistance of the liquid crystal optical element of the present invention.

Now, evaluation test regarding the impact resistance of the liquid crystal optical element will be explained below. FIG. 5 is a sectional view schematically illustrating an evaluation apparatus to evaluate the impact resistance of the liquid crystal optical element, and FIG. 6 is a plan view schematically illustrating the evaluation apparatus. In FIGS. 5 and 6, numerical reference 201 designates a liquid crystal optical element about 10 cm square, numerical reference 204 designates an iron ball to add an impact by free fall to the liquid crystal optical element 201, and numerical references 202 and 203 designate rubber sheets which convert the impact from the fallen iron ball 204 into an impact waveform close to one obtained when tapped by a human hand, and reference numeral 205 designates a test stand which fixes the liquid crystal optical element 201 and the rubber sheet 203.

As a evaluation method, first, the liquid crystal optical element 201 is fixed on the test stand 205 made of a metal and set on the rubber sheet 203 in order to obtain substantial practical installation state. The rubber sheet 202 having a thickness of about 1 mm is put on the center portion of the liquid crystal optical element 201, and the iron ball 204 having a diameter of about 1 cm (such as a ball for Japanese pinball) is made to freely fall so that it falls on the center of the rubber sheet 202.

The freely fallen iron ball 204 colloids against the rubber sheet 202 and add an impact thereon, and the impact is transmitted to the liquid crystal optical element 201 as an impact waveform close to one obtained when tapped by a human hand. If the impact force at this time exceeds the impact resistance of the liquid crystal optical element 201, the polymer constituting the liquid crystal/polymer composite layer 5 of the liquid crystal optical element 201 deforms or the alignment of the liquid crystal changes, and white turbidity occurs. Accordingly, by presence or absence of the white turbidity on the liquid crystal optical element 201, the impact resistance of the liquid crystal optical element 201 was evaluated.

The degree of the impact force by the iron ball 204 is controlled by adjusting the height from which the iron ball 204 is fallen. The degree of the impact force occurred is measured by an acceleration pickup (not shown) and determined as the acceleration. The results of evaluation with respect to the liquid crystal optical elements of the above Example and Comparative Example are shown in Table 1.

| Items | Example | | Comparative Example | |
|---|---|---|---|---|
| Distance of iron ball free fall (cm) | 50 | 70 | 50 | 70 |
| Acceleration (G) | 500 | 700 | 500 | 700 |
| Presence or absence of white turbidity | ◯ | ◯ | X | X |

Note:
For measurement of the acceleration, acceleration pickup 710-C (trademark) manufactured by EMIC CORPORATION was used. Presence or absence of white turbidity was judged by visual test.
X: white turbidity occurred,
◯: no white turbidity occurred.

As evident from Table 1, the liquid crystal optical element of Example showed favorable impact resistance. Namely, on the liquid crystal optical element of the present Example, no white turbidity occurred on the display part even by the impact of the iron ball 204 freely fallen from a height of 70 cm. On the other hand, on the liquid crystal optical element of Comparative Example, white turbidity occurred by an impact from a height of 50 cm. Further, in Example of the present invention, in a case corresponding to the acceleration of 1,000 G (a distance of free fall of about 100 cm), a result of X was obtained.

The impact force which is applied to the liquid crystal optical element 201 as a subject to be tested when the iron ball 204 is made to freely fall from a height of 50 cm is substantially the same level as the impact force when a person punches in the liquid crystal optical element with his fists.

From the above results, it is found that the liquid crystal optical element of Example 1 is more excellent in the impact resistance than the liquid crystal optical element of Comparative Example. The liquid crystal optical element of the present Example has such an impact resistance that no white turbidity will occur even when a person punches in the display part by his fists.

EXAMPLE 2

In Example of the present invention, 85 parts of a nematic liquid crystal having negative dielectric anisotropy (Tc=98° C., Δε=−5.6, Δn=0.220), 12.5 parts of a compound of the above formula (8) as the bifunctional polymerizable compound (A), 2.5 parts of a compound of the above formula (7) as the bifunctional polymerizable compound (B) and benzoin isopropyl ether as a photopolymerization initiator in an amount of 3 parts based on the total amount of 100 parts of the photopolymerizable monomers (the compound of the formula (8) and the compound of the formula (7)), were mixed.

The mixed liquid was heated to 90° C. with stirring to make it in a liquid crystal phase, so that the mixed liquid was in an isotropic phase and uniform, and then the temperature was lowered to 60° C. Then, the mixed liquid being in a liquid crystal phase was confirmed, and the mixed liquid was prepared.

A liquid crystal cell was prepared as follows. A pair of substrates comprising a transparent electrode and a polyimide thin film for vertical alignment formed on the electrode, was prepared. Then, the pair of the substrates were bonded so that the polyimide thin films faced each other by means of an epoxy resin (peripheral seal) printed with a width of about 1 mm on four sides, via a very small amount of resin beads (diameter 6 μm) spread, to form a liquid crystal cell. Then, the mixed liquid was injected into the liquid crystal cell.

In a state where the liquid crystal cell was held at 33° C., by means of a HgXe lamp with a dominant wavelength of about 365 nm, the liquid crystal cell was irradiated with ultraviolet rays from upper side at 10 mW/cm$^2$, and from lower side at about 10 mW/cm$^2$ for 10 minutes, to form a liquid crystal/polymer composite layer between the substrates by a polymerization phase separation method, and a liquid crystal optical element having reverse mode transmittance/scattering characteristics was obtained.

COMPARATIVE EXAMPLE B

In Comparative Example as a comparison with the above Example, the bifunctional polymerizable compound (B) was not added, and 80 parts of a nematic liquid crystal having negative dielectric anisotropy, 20 parts of the bifunctional polymerizable compound (A) represented by the above formula (7), and 1 part of the polymerization initiator based on 100 parts of the bifunctional polymerizable compound (the compound of the formula (7)), were mixed. Then, photopolymerization phase separation was carried out in the same manner as in Example except that the polymerization temperature was 40° C., the time of irradiation with ultraviolet rays was 10 minutes, and the intensity of illumination was set at 1 mW/cm$^2$ (upper side) and 1 mW/cm$^2$ (lower side), to form a liquid crystal polymer/composite layer, and a liquid crystal optical element showing reverse mode optical characteristics was produced.

(Evaluation Test 2)

A test was carried out in the same manner as in the above Example 1, whereupon similar results to Example 1 were obtained.

The liquid crystal optical element of the present invention can reversibly switch over the two transmittance/scattering optical states, and it can be favorably used for e.g. a liquid crystal shutter, a privacy glass, a partition, a high speed optical shutter, a measuring instrument, a screen, optical communication, a device to control beam of light, a touch-sensitive display device and an instrument panel display device of automobiles.

Further, it may favorably be utilized for e.g. a head-up display for automobiles, a display device for promotion at the store front such as show window, an information display device set near the information desk in e.g. an office, a plant or an exhibition hall, an information display device set near the register of a convenience store or a display device of an arcade game machine. It may favorably be utilized for a liquid crystal optical element to be mounted on vehicles, for which impact resistance is particularly required. Further, the liquid crystal optical element of the present invention may be used as e.g. a lighting device in addition to a display device.

What is claimed is:

1. A liquid crystal optical element, comprising:
   a pair of substrates with electrodes, of which at least one is transparent; and
   an electrooptical functional layer containing a liquid crystal and a polymer sandwiched between the substrates, and which is configured to exhibit a light beam transmitting state and a light beam scattering state by changing an alignment state of the liquid crystal in response to application of a voltage, wherein
   the polymer forms column resins, which include resins of which the major axis directions substantially agree with a normal direction of a plane of the substrates with electrodes, and resins which tilt from the normal direction;
   a content of the polymer in the electrooptical functional layer is at least 10 wt %;
   the alignment direction of the liquid crystal in the light beam transmitting state substantially agrees with the normal direction of the substrate plane; and
   an area occupied by the column resins in the electrooptical functional layer on a horizontal plane to a plane of the substrates with electrodes substantially decreases as the distance from the substrates with electrodes increases.

2. The liquid crystal optical element according to claim 1, wherein among the column resins, the resins which tilt from the normal direction of the plane of the substrates with electrodes, have an average tilt angle of from 15 to 50°.

3. The liquid crystal optical element according to claim 1, wherein at least part of the column resins have a branched moiety.

4. The liquid crystal optical element according to claim 3, wherein at least part of the column resins having a branched moiety are connected to different column resins by means of the branched moiety.

5. The liquid crystal optical element according to claim 1, wherein the diameter of a cross-section vertical to the major axis direction of the column resins is from 0.05 to 1 μm.

6. The liquid crystal optical element according to claim 1, wherein the content of the polymer in the electrooptical functional layer is at most 50 wt %.

7. A liquid crystal optical element, comprising:
   a pair of substrates with electrodes, of which at least one is transparent; and
   an electrooptical functional layer containing a liquid crystal and a polymer sandwiched between the substrates, and which is configured to exhibit a light beam transmitting state and a light beam scattering state by changing an alignment state of the liquid crystal in response to application of a voltage, wherein
   the polymer forms a plurality of assemblies of column resins;
   each of the assemblies of the column resins is formed so that it has an axial core which substantially agrees with a normal direction of a plane of the substrates with electrodes, and an area occupied by the column resins in the electrooptical functional layer on the horizontal plane to the plane of the substrates with electrodes substantially decreases as the distance from the substrates with electrodes increases; and
   the assemblies of the column resins are connected to one another to form a domain region of the liquid crystal.

8. The liquid crystal optical element according to claim 1, wherein the liquid crystal is a nematic liquid crystal showing negative dielectric anisotropy, and an alignment film which aligns the liquid crystal vertically to the plane of the substrates with electrodes is provided on at least one of the substrates with electrodes.

9. A process for producing a liquid crystal optical element comprising a pair of substrates with electrodes, a pair of alignment films and an electrooptical functional layer containing a liquid crystal and a polymer sandwiched between the substrates and disposed to be in contact with the pair of alignment films, the process comprising:
   forming a liquid crystalline mixture (D) containing at least one type of a bifunctional polymerizable compound (A) represented by the formula (1), at least one type of a bifunctional polymerizable compound (B) represented by the formula (2) and a non-polymerizable liquid crystalline composition (C);

disposing the mixture (D) between a pair of alignment films; and polymerizing the polymerizable compounds in the mixture (D) in a state where the mixture (D) shows liquid crystallinity, to form a polymer:

$$A_1\text{-}R_1\text{-}X_1\text{-}(Q_3\text{-}Z_2)_p\text{-}Q_1\text{-}Z_1\text{-}Q_2(Z_3\text{-}Q_4)_q\text{-}X_2\text{-}R_2\text{-}A_2 \quad (1)$$

$$A_3\text{-}R_3\text{-}A_4 \quad (2)$$

wherein each of $A_1$, $A_2$, $A_3$ and $A_4$ which are independent of one another, is an acryloyloxy group, a methacryloyloxy group, a vinyl ether group, a vinyl group or a glycidyl ether group;

each of $Q_1$, $Q_2$, $Q_3$ and $Q_4$ which are independent of one another, is a 1,4-phenylene group which may have a substituent, a 1,4-cyclohexylene group or a pyrimidine-2,5-diyl group;

each of $X_1$ and $X_2$ which are independent of each other, is a single bond, an oxygen atom or an ester linkage;

each of $R_1$ and $R_2$ which are independent of each other, is a single bond or a linear or branched $C_{1-20}$ alkylene group which may have one or more ethereal oxygen atoms between carbon atoms;

each of $Z_1$, $Z_2$ and $Z_3$ which are independent of one another, is a single bond, $C(=O)-O-$, $-O-C(=O)-$, $-CH_2-CH_2-$, $-C\equiv C-$, $-CH_2-O-$, $-O-CH_2-$, $-CH=N-$ or $N=CH-$;

$R_3$ is a linear or branched $C_{1-50}$ alkylene group which may have one or more ethereal oxygen atoms between carbon atoms; and each of p and q, which are independent of each other, is 0 or 1.

10. The process for producing a liquid crystal optical element according to claim 9, wherein the bifunctional polymerizable compound (A) represented by the formula (1) is a compound which satisfies the following conditions: each of $A_1$ and $A_2$ which are independent of each other, is an acryloyloxy group, a methacryloyloxy group or a vinyl ether group; each of $Q_1$, $Q_2$, $Q_3$ and $Q_4$ which are independent of one another, is a 1,4-phenylene group which may have a substituent, or a 1,4-cyclohexylene group; each of $X_1$ and $X_2$ which are independent of each other, is a single bond, an oxygen atom or an ester linkage; each of $R_1$ and $R_2$ which are independent of each other, is a single bond or a linear or branched $C_{2-20}$ alkylene group which may have one or more ethereal oxygen atoms between carbon atoms; each of $Z_1$, $Z_2$ and $Z_3$ which are independent of one another, is a single bond, $-C(=O)-O-$, $-O-C(=O)-$, $-CH_2-CH_2-$, $-C\equiv C-$, $-CH_2-O-$ or $-O-CH_2-$; and each of p and q is 0, or one is 0 and the other is 1.

11. The process for producing a liquid crystal optical element according to claim 9, wherein the bifunctional polymerizable compound (A) represented by the formula (1) is a compound which satisfies the following conditions:

each of $A_1$ and $A_2$ which are independent of each other, is an acryloyloxy group or a methacryloyloxy group;

each of $Q_1$ and $Q_2$ is a 1,4-phenylene group which may have a substituent, and each of $Q_3$ and $Q_4$ which are independent of each other, is a 1,4-phenylene group which may have a substituent, or a 1,4-cyclohexylene group;

each of $Z_1$, $Z_2$ and $Z_3$ which are independent of one another, is a single bond, $-C(=O)-O-$, $-O-C(=O)-$, $-CH_2-CH_2-$ or $-C\equiv C-$; and each of p and q is 0, or one is 0 and the other is 1.

12. The process for producing a liquid crystal optical element according to claim 9, wherein the bifunctional polymerizable compound (A) represented by the formula (1) is a compound which satisfies the following conditions:

each of $A_1$ and $A_2$ is an acryloyloxy group;

each of $Q_1$ and $Q_2$ is a 1,4-phenylene group which may have a substituent, and each of $Q_3$ and $Q_4$ which are independent of each other, is a 1,4-phenylene group which may have a substituent, or a 1,4-cyclohexylene group; inconvenienced each of $R_1$ and $R_2$ which are independent of each other, is a linear or branched $C_{2-20}$ alkylene group;

$Z_1$ is a single bond, $-C(=O)-O-$, $-O-C(=O)-$, $-CH_2-CH_2-$ or $-C\equiv C-$, and each of $Z_2$ and $Z_3$ is a single bond, and each of p and q is 0, or one is 0 and the other is 1.

13. The process for producing a liquid crystal optical element according to claim 9, wherein the bifunctional polymerizable compound (B) represented by the formula (2) is a compound which satisfies the following conditions:

each of $A_3$ and $A_4$ which are independent of each other, is an acryloyloxy group, a methacryloyloxy group or a vinyl ether group; and $R_3$ is $-R_4-$ or $(R_5-O)_n-R_5-$, wherein $R_4$ is a $C_{2-20}$ linear or branched alkylene group, $R_5$ is a $C_{2-8}$ linear or branched alkylene group, and n is an integer of from 1 to 10.

14. The process for producing a liquid crystal optical element according to claim 13, wherein $R_4$ is a $C_{2-20}$ linear alkylene group, $R_5$ is $-(CH_2)r-$, $-CH_2-CH(CH_3)-$, $-CH_2-CH_2-CH(CH_3)-$ or $CH_2-CH_2-C(CH_3)_2-$ (wherein r is an integer of from 2 to 5), and n is an integer of from 1 to 6.

15. The process for producing a liquid crystal optical element according to claim 9, wherein the dielectric anisotropy of the non-polymerizable liquid crystalline composition (C) is negative.

16. The process for producing a liquid crystal optical element according to claim 9, wherein the bifunctional polymerizable compound (A) does not show liquid crystallinity as a single compound.

17. The process for producing a liquid crystal optical element according to claim 9, wherein the bifunctional polymerizable compound (A) shows liquid crystallinity as a single compound at a temperature at the time of polymerization.

18. The process for producing a liquid crystal optical element according to claim 9, wherein the liquid crystalline mixture (D) contains from 5 to 30 mass % of the bifunctional polymerizable compound (A), from 0.5 to 20 mass % of the bifunctional polymerizable compound (B) and from 50 to 94.5 mass % of the non-polymerizable liquid crystalline composition (C) based on the total amount of the bifunctional polymerizable compound (A), the bifunctional polymerizable compound (B) and the non-polymerizable liquid crystalline composition (C), and the mixture (D) further contains from 0.01 to 20 parts by weight of a polymerization initiator based on the total amount of 100 parts by weight of the bifunctional polymerizable compound (A) and the bifunctional polymerizable compound (B).

19. A liquid crystal optical element produced by means of the process for producing a liquid crystal optical element as defined in claim 9.

20. A liquid crystal optical element, comprising:

a pair of substrates with electrodes, of which at least one is transparent; and an electrooptical functional layer containing a liquid crystal and a polymer sandwiched between the substrates, and which is configured to exhibit a light beam transmitting state and a light beam scattering state by changing an alignment state of the liquid crystal in response to application of a voltage, wherein the polymer forms column resins, which include resins of which the major axis directions substantially agree with a normal direction of a plane of the substrates with electrodes, and resins which tilt from the normal direction;

a content of the polymer in the electrooptical functional layer is at least 10 wt %;

the alignment direction of the liquid crystal in the light beam transmitting state substantially agrees with the normal direction of the substrate plane; and among the column resins, the resins which tilt from the normal direction of the plane of the substrates with electrodes, have an average tilt angle of from 15 to 50°.

21. A liquid crystal optical element, comprising:

a pair of substrates with electrodes, of which at least one is transparent; and an electrooptical functional layer containing a liquid crystal and a polymer sandwiched between the substrates, and which is configured to exhibit a light beam transmitting state and a light beam scattering state by changing an alignment state of the liquid crystal in response to application of a voltage, wherein the polymer forms column resins, which include resins of which the major axis directions substantially agree with a normal direction of a plane of the substrates with electrodes, and resins which tilt from the normal direction;

a content of the polymer in the electrooptical functional layer is at least 10 wt %;

the alignment direction of the liquid crystal in the light beam transmitting state substantially agrees with the normal direction of the substrate plane; and at least part of the column resins have a branched moiety; and at least part of the column resins having a branched moiety are connected to different column resins by means of the branched moiety.

22. A liquid crystal optical element, comprising:

a pair of substrates with electrodes, of which at least one is transparent; and an electrooptical functional layer containing a liquid crystal and a polymer sandwiched between the substrates, and which is configured to exhibit a light beam transmitting state and a light beam scattering state by changing an alignment state of the liquid crystal in response to application of a voltage, wherein the polymer forms column resins, which include resins of which the major axis directions substantially agree with a normal direction of a plane of the substrates with electrodes, and resins which tilt from the normal direction;

a content of the polymer in the electrooptical functional layer is at least 10 wt %;

the alignment direction of the liquid crystal in the light beam transmitting state substantially agrees with the normal direction of the substrate plane; and the diameter of a cross-section vertical to the major axis direction of the column resins is from 0.05 to 1 μm.

* * * * *